US006416613B1

(12) United States Patent
Patrick et al.

(10) Patent No.: US 6,416,613 B1
(45) Date of Patent: *Jul. 9, 2002

(54) PRODUCTS OF AND METHOD FOR IMPROVING ADHESION BETWEEN SUBSTRATE AND POLYMER LAYERS

(75) Inventors: Rodney Lane Patrick, Oceanside; James Michael Caldwell, Cardiff, both of CA (US)

(73) Assignee: Nextec Applications, Inc., Vista, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,235

(22) Filed: Jun. 23, 1998

(51) Int. Cl.⁷ ............................................. B32B 31/00
(52) U.S. Cl. .................. 156/281; 156/164; 156/182; 427/176; 427/358; 427/369
(58) Field of Search ............................. 156/164, 281, 156/182; 427/176, 358, 369

(56) References Cited

U.S. PATENT DOCUMENTS

| | | | |
|---|---|---|---|
| 2,673,823 A | | 3/1954 | Biefel et al. |
| 2,893,962 A | | 7/1959 | Bartell |
| 3,360,394 A | | 12/1967 | Griffin et al. |
| 3,436,366 A | | 4/1969 | Modic |
| 3,574,022 A | * | 4/1971 | Lampert ................... 156/182 |
| 3,594,213 A | | 7/1971 | Rudman |
| 3,639,155 A | | 2/1972 | Hartlein et al. |
| 3,762,978 A | | 10/1973 | Holmes et al. |
| 3,962,511 A | | 6/1976 | Foti |
| 3,969,177 A | | 7/1976 | Doran et al. |
| 3,972,757 A | | 8/1976 | Derderian et al. |
| 4,052,521 A | * | 10/1977 | Ferrari ...................... 427/176 |
| 4,109,543 A | | 8/1978 | Foti |
| 4,112,179 A | | 9/1978 | Maccalous et al. |
| 4,181,157 A | | 1/1980 | DeCamp |
| 4,205,559 A | | 6/1980 | Long et al. |
| 4,293,611 A | | 10/1981 | Martin |
| 4,297,265 A | | 10/1981 | Olsen |
| 4,472,470 A | | 9/1984 | Modic |
| 4,478,895 A | | 10/1984 | Makami et al. |
| 4,483,973 A | | 11/1984 | Lucas et al. |
| 4,500,584 A | | 2/1985 | Modic |
| 4,504,549 A | | 3/1985 | Pines et al. |
| 4,511,615 A | | 4/1985 | Ohta |
| 4,525,400 A | | 6/1985 | Surprenant |
| 4,588,614 A | | 5/1986 | Lauchenauer |
| 4,666,765 A | * | 5/1987 | Caldwell et al. ............. 427/358 |
| 4,681,808 A | | 7/1987 | Lefler, III |
| 4,794,192 A | | 12/1988 | Stein |
| 4,872,220 A | | 10/1989 | Haruvy |
| 4,918,126 A | | 4/1990 | Matsushita et al. |
| 4,942,093 A | | 7/1990 | Lawson |
| 4,988,779 A | | 1/1991 | Medford et al. |
| 4,991,232 A | | 2/1991 | Taylor |
| 5,004,643 A | | 4/1991 | Caldwell |
| 5,023,288 A | | 6/1991 | Hirai et al. |
| 5,024,594 A | | 6/1991 | Athayde et al. |

(List continued on next page.)

FOREIGN PATENT DOCUMENTS

| | | |
|---|---|---|
| EP | 0 491 483 A1 | 11/1991 |
| WO | WO 89/08553 | 9/1989 |
| WO | WO 89/08554 | 9/1989 |
| WO | WO 89/08555 | 9/1989 |
| WO | Wo 96/30432 | 10/1996 |
| WO | WO 96/36757 | 11/1996 |
| WO | WO 96/36758 | 11/1996 |
| WO | WO 96/36761 | 11/1996 |

OTHER PUBLICATIONS

Stein Et. Al., Location of the Adhesion Promoter (y–Aminopropyl) trimethoxsilane in a cured silicone RTV Matrix, Macromolecules, 1986, pp. 2291–2294, V19, American Chemical Society, U.S.

Primary Examiner—John J. Gallagher
(74) Attorney, Agent, or Firm—David E. Heisey; Luce Forward Hamilton & Scripps

(57) ABSTRACT

The present invention relates to a method for improving both adhesion between substrate and polymer layers and the durability of such composite structures; while maintaining the malleability and preferred characteristics of the original substrate. Quite unexpectedly, the application of a layer or film upon an uncured, encapsulated base substrate which has been encapsulated by the shear thinning methods of the present invention, results in superior adhesion of multiple layers when compared to conventional layering, coating or composite manufacturing methods. Moreover, the uncured or at most, semi-cured, polymer composition applied to the base substrate ensures that the substrate maintains maximum flexibility for subsequent shaping into composite articles prior to curing. The methods described herein produce multiple layer composite articles that are lighter, stronger, more flexible and utilize less material, than composite articles produced by conventional techniques. The method comprises applying an uncured, substantially solvent free, polymer composition exhibiting thixotropic or pseudoplastic characteristics, onto a base substrate having structural elements and interstices therebetween; shear thinning the polymer composition to place it into the base substrate, thereby encapsulating most of the structural elements while leaving a plurality of interstitial spaces open; overlaying a layer or film of polymer or thermoplastic material to at least one surface of the uncured encapsulated base substrate; pressuring the layer or film into the interstices of the uncured encapsulated base substrate to form a chemical and mechanical interlocking bond between the polymer composition of the base substrate and the overlay material; and optionally shaping the multi layer composite and curing the completed composite. This method produces multi layer composite articles and medical garments exhibiting increased adhesion and durability with excellent malleability and flexibility over conventional methods.

38 Claims, 8 Drawing Sheets

U.S. PATENT DOCUMENTS

| | | |
|---|---|---|
| 5,028,485 A | 7/1991 | Van Hooijdonk |
| 5,096,981 A | 3/1992 | Traver |
| 5,128,198 A | 7/1992 | Dyksterhouse et al. |
| 5,128,394 A | 7/1992 | Traver et al. |
| 5,175,057 A | 12/1992 | Wengrovius et al. |
| 5,175,058 A | 12/1992 | Traver |
| 5,180,585 A | 1/1993 | Jacobson et al. |
| 5,190,827 A | 3/1993 | Lin |
| 5,209,965 A | 5/1993 | Caldwell |
| 5,292,586 A | 3/1994 | Lin et al. |
| 5,308,887 A | 5/1994 | Ko et al. |
| 5,335,372 A | 8/1994 | Wiedner et al. |
| 5,342,870 A | 8/1994 | Stein et al. |
| 5,360,852 A | 11/1994 | Traver et al. |
| 5,371,136 A | 12/1994 | Brooks et al. |
| 5,374,485 A | 12/1994 | Wakatsuka et al. |
| 5,391,423 A | 2/1995 | Wnuk et al. |
| 5,398,729 A | 3/1995 | Spurgat |
| 5,399,614 A | 3/1995 | Lin et al. |
| 5,416,144 A | 5/1995 | Stein et al. |
| 5,418,051 A | 5/1995 | Caldwell |
| 5,436,303 A | 7/1995 | Lin |
| 5,501,880 A | 3/1996 | Parker et al. |
| 5,503,940 A | 4/1996 | Majumdar et al. |
| 5,573,813 A * | 11/1996 | Custer et al. ................ 427/358 |
| 5,677,046 A | 10/1997 | Fawley et al. |
| 5,698,303 A | 12/1997 | Caldwell |
| 5,700,532 A | 12/1997 | Chiou |
| 5,714,265 A | 2/1998 | Meguriya et al. |
| 5,876,792 A * | 3/1999 | Caldwell .................... 427/176 |

* cited by examiner

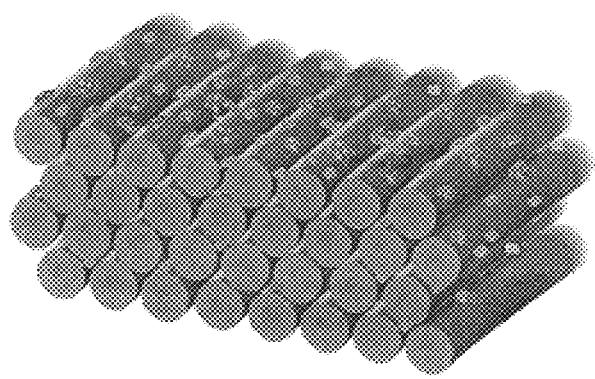
Figure 1a: Prior Art
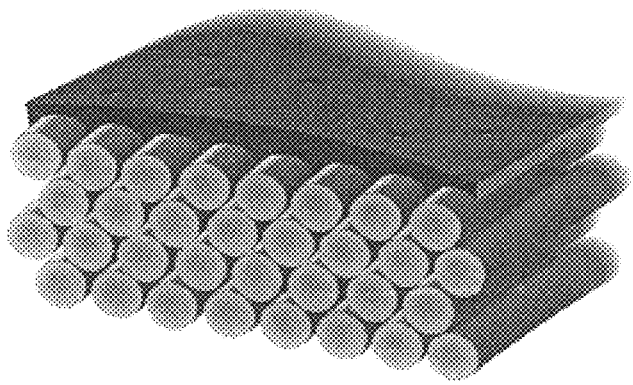
Figure 1b: Prior Art
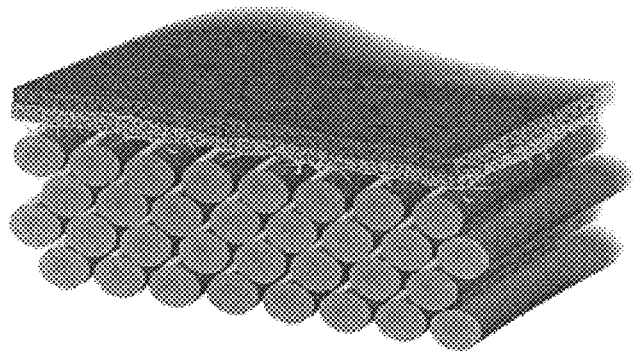
Figure 1c: Prior Art

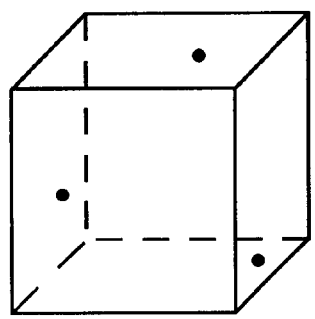
Figure 4a
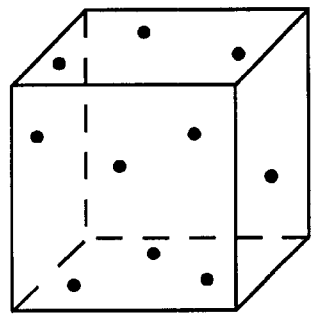
Figure 4b

PRODUCTS OF AND METHOD FOR IMPROVING ADHESION BETWEEN SUBSTRATE AND POLYMER LAYERS

FIELD OF THE INVENTION

The present invention relates generally to methods for improving adhesion between substrates and polymers and products made according to such methods. Such methods may produce products in areas as diverse as industrial composite hoses and medical garments.

BACKGROUND OF THE INVENTION

Substrate composite articles having a plurality of layers, especially those used to make garments, air bags and industrial composites, could be vastly improved if there was a method for improving adhesion between substrate and polymer layers; while maintaining the malleability and characteristics of the original substrate. For example, a problem that has long plagued the art has been the inability to construct a long-lasting, durable, reusable medical garment that is breathable and comfortable but impermeable to disease causing microorganisms such as viruses and bacteria. Moreover, industrial composite articles with increased durability, malleability and strength have been sought after by industry leaders for many years. What is needed is a single method of improving adhesion between substrate and polymer layers without adversely affecting desired properties of the original untreated substrate.

Methods for improving adhesion between multiple layers typically involve a combination of surface modification techniques. Several different physical types of surface modification exist. One type of surface modification is to covalently bind a modifier to a surface of a substrate material. Such binding can be achieved in many different ways such as chemical grafting onto the surface of the substrate through condensation or high energy addition reactions, or oxidizing the substrate away leaving a covalently bound modified surface. Covalently bound modifiers are usually the most durable surface modifications. However, such techniques are complicated, expensive and often environmentally hazardous to employ. Another type of surface modification is to cause an association or entrapment of the modifying molecule (or part of the molecule) with the substrate material. This commingling of modifier molecules and substrate relies on molecular attractions such as Van der Waals forces, dipole/dipole interactions, Hydrogen bonding, as well as steric factors to hold the modifier in/on the surface of the substrate. The factors that effect this type of reaction are similar to those that effect thermosol dyeing or blooming. Still another type of surface modification involves the retention of modifier by substrate with only adhesive and cohesive forces between the modifier to the substrate and the modifier to itself respectively. This last technique is the most common type of surface modification in the textile area and is the one in which the present invention makes a dramatic difference in the field of adhesion.

Methods for improving adhesion between substrate and polymer layers have previously come at the expense of other qualities such as durability, malleability, the environment, or performance characteristics. Addressing one aspect of desired qualities usually results in sacrificing other qualities. Conventional treatments for improving adhesion between substrate and polymer layers are typically unable to solve this dilemma and fall into the general categories of (i) surface coatings; (ii) saturations or impregnations; (iii) layers of fibers and/or polymers; (iv) unique chemical compositions; and (v) combinations of the foregoing.

I. Coatings

Coatings can be one or two sided but tend to be step gradients from one surface through the width of the substrate being treated, as opposed to homogeneous materials or continuous gradients. A step gradient has certain intrinsic disadvantages, due mostly to the fact that the coating composition contacts the substrate at one surface, thereby causing a substrate/coating-composition interface. Adhesion at this substrate/coating-composition interface derives mostly from surface forces, less than optimal mechanical interlocking, and sometimes little to no contribution from the cohesive strength of the modifying or coating material. Secondly because of the disparate materials plied together the resultant tactile properties of the composite (i.e.—hand, drape, etc.) are usually distinctly different than the base fabric. Typically, this interface tends to separate upon prolonged washing conditions or upon high stress conditions.

Prior fluorochemical and silicone (See U.S. Pat. Nos. 3,436,366; 3,639,155; 4,472,470; 4,500,584; and 4,666,765) fabric coating treatments evidently can protect only that side of the fabric upon which they are disposed. Such treatments significantly alter the hand, or tactile feel, of the treated side. Prior silicone fabric coatings typically degrade the tactile finish, or hand, of the fabric and give the coated fabric side a rubberized finish which is not appealing for many fabric uses, particularly garments. Coating techniques also encounter durability issues.

Porous webs have been further shown to be surface coated in, for example, U.S. Pat. Nos. 4,478,895; 4,112,179; 4,297,265; 2,893,962; 4,504,549; 3,360,394; 4,293,611; 4,472,470; and 4,666,765. These surface coatings impart various characteristics to the surface of a web, but remain on the surface and do not provide a film over the individual internal fibers and/or yarn bundles of the web. In addition, such coatings on the web surface tend to wash away quickly.

II. Saturation and Impregnation

Prior treatments of webs by saturation or impregnation with a polymer material, such as a silicone resin, polyurethane or neoprene material, are typically accomplished by immersion, using a low viscosity liquid so that the low viscosity liquid can flow readily into the web, and be adsorbed or absorbed therewithin. Immersion applications of one hundred percent (100%) solids, solvent dissolved solids, or aqueous emulsions can be performed by running a fabric through a bath and then drying. Particularly for flexible webs, including fabrics, an immersion application of a liquid or paste composition to the web is achieved, for example, by the so-called padding process wherein a fabric material is passed first through a bath and subsequently through squeeze rollers in the process sometimes called single-dip, single-nip padding. Alternatively, for example, the fabric can be passed between squeeze rollers, the bottom one of which carries the liquid or paste composition in a process sometimes called double-dip or double-nip padding. Usually, one hundred percent (100%) solids applications rely on low molecular weight materials (with viscosity's low enough for processing) that tend to yield a treated substrate with poor mechanical properties or higher molecular weight materials which often do not yield optimal penetration into the substrate. Solvent processing has environmental and economic issues such as removal of the solvent, fate of Volatile Organic Compounds (VOCs), and government permit requirements which are becoming stricter. Solvent and emulsion processing both are thermodynamically driven to yield low surface coverage due to poor substrate wet out (greater than zero contact angle), if the modifier is of a lower surface tension than the substrate (e.g. Durable Water Repellant—DWR). Provided the surface of the substrate is wet out by the modifier these techniques still require removal of the solvent or aqueous media which tends to cause imperfections in the polymer network, manifested as reduced mechanical properties of the modifier/substrate combination.

The silicone resin treated product is typically a rubberized web, or fabric, that is very heavily impregnated with silicone. For example, U.S. Pat. No. 2,673,823 teaches impregnating a polymer into the interstices of a fabric and thus fully filling the interstices. Thus, this patent provides no control of the saturation of the fabric and instead teaches full saturation of the interstices of the fabric. Such a treated web is substantially devoid of its original tactile and visual properties, and instead has the characteristic rubbery properties of a cured silicone polymer.

Prior treatments of webs that force a composition into the spaces of the web while maintaining some breathability have relied on using low viscosity compositions or solvents to aid in the flow of the composition. U.S. Pat. No. 3,594,213 describes a process for impregnating or coating fabrics with liquified compositions to create a breathable fabric. Thus, the method of this patent imparts no energy into the composition to liquify it while forcing it into the spaces of the web, because the composition is substantially liquified before placement onto and into the web. U.S. Pat. No. 4,588,614 teaches a method for incorporating an active agent into a porous substrate. This process utilizes a solvent to aid in the incorporation of the active agent into the web.

Still other impregnation techniques employ dispersed polymer compositions in some type of solvent, such as water or volatile organic based solvents. The placement of polymer upon individual elements of the web is random and inconsistent. The polymer fails to completely encase the individual elements or fibers of the web, thus creating individual spots of polymer. Each spot of polymer has a polymer/fiber interface whereby adhesion results. Such techniques are illustrated in different capacities under U.S. Pat. Nos. 5,128,198 and 5,371,136. The adhesive strength of the resultant product is limited by the bond strength of the polymer particles to the individual fibers or elements of the web.

III. Layers

Several references describe laminates or layers of fabrics and/or polymers. Laminations use an adhesive tie coat to keep a film in contact with the fabric surface. This technique exhibits the same limitations described above for coatings, as well as environmental issues with the adhesives and any other part of the film preparation process. Additional difficulties are encountered in ensuring that the mechanical performance differential between the substrate, adhesive, and film is balanced. For example, if shrinkage of any of the three materials passes the initial yield stress of either of the other materials there will be deformation, and if it passes the ultimate tensile strength there will be delamination of the composite. U.S. Pat. Nos. 4,872,220; 5,024,594; 5,180,585; 5,335,372; and 5,391,423; describe articles that use layers of fabrics and/or polymers to protect blood, microbes, and viruses from penetrating through the fabrics. Similarly, U.S. Pat. No. 4,991,232 describes a medical garment comprising a plurality of plies to prevent blood from penetrating through the garment. Layers of fabrics and/or polymers traditionally result in heavier garments and utilize additional raw materials. Moreover, the coating of a polymer upon a web which has been treated by the above techniques, exhibits the same limitations as discussed above.

Some layering techniques, particularly related to industrial composites, require a combination of steps to improve adhesion and/or obtain multiple layers of polymer and fabrics while shaping the article. U.S. Pat. No. 3,762,978 describes a process for preparing a surface of a cured silicone polymer with a mineral acid for the purpose of adhering another uncured silicone polymer composition. This technique requires specific compositions and is not universally available for all compositions. Moreover, the technique relies on an initial silicone polymer coating, having the limitations of coatings discussed above.

IV. Chemical Compositions

Most industry efforts to improve adhesion of one layer to another have focused primarily on the chemistry involved in adhesion. Many patents, too numerous to cite, involve unique chemical compositions. The large number of patents directed to this art are testimony to the fact that each composition has unique abilities and limitations related to adhesion, durability and/or other performance characteristics. A sampling of patents related to unique compositions for improved adhesion comprise U.S. Pat. Nos. 4,681,808; 5,292,586; 5,360,852; 5,416,144; 5,374,485; 5,342,870; 4,525,400; 4,483,973; 5,308,887; 5,190,827; 5,175,058; 5,175,057; 5,128,394; 5,096,981; 5,028,485; 4,988,779; 4,794,192; 5,436,303; 5,399,614; 5,714,265; 4,918,126; 4,205,559; 5,023,288; 4,942,093, 5,503,940, 5,700,532; European Publication No. 0 491 483 A1; and an article by Stein et al., in *Macromolecules,* 19: 2291–2294, 1986. Most of these references identify specific chemical moieties related to adhesion. Two such patents, U.S. Pat. Nos. 5,714, 265 and 5,700,532 describe the use of two different curing agents, a platinum based catalyst polymer and a peroxide based catalyst polymer, interacting to create an improved adhesion.

V. Combination of Techniques

Some techniques do not easily fall within any of the categories listed above because they rely on a plurality of factors to improve adhesion of multiple substrate/polymer layers. These techniques typically recognize that mechanical interlocking and chemistry play a role in the adhesion process. However, the methods employed to achieve such mechanical interlocking of one layer to another are limited to traditional methods described above, such as impregnation or emulsion/immersion techniques, exhibiting the limitations of such techniques as described above.

U.S. Pat. No. 3,962,511 describes a textile fabric composite prepared by the sequential steps of (A) encapsulating the fibers of the fabric with a polyurethane reaction mixture, (B) drying and at least partially curing said reaction mixture, (C) adhering an overlay of a flexible thermoplastic to one surface of said encapsulated fabric and (D) pressing said thermoplastic into the interstices of said encapsulated fabric under pressure and with the application of heat. Although the term "encapsulate" is used, the method of achieving such "encapsulation" is nothing more than a standard organic solvent immersion technique, as described above. This technique is environmentally hazardous and produces random, discontinuous placement of polymer upon the surfaces of fibers, resulting in fiber/polyurethane interfaces. Since the polyurethane does not truly encapsulate (i.e. surround) the individual fibers, the adhesion is limited to the fiber/polyurethane bond. Moreover, the partial curing of the polyurethane before application of another layer results in a less malleable textile substrate than the original textile web, thereby creating problems for shaping the treated substrate for composite articles, such as hoses or belts.

In an effort to address the malleability/flexibility concerns of other techniques, U.S. Pat. No. 4,109,543 describes a composite laminate process comprising a hot melt type thermoplastic material which is heated to allow it to penetrate into the base textile substrate. The thermoplastic is heated to penetrate into the interstices of the fabric a maximum of from about 15% to about 75%, but does not penetrate a substantial amount into the yarn structure itself, thereby permitting an optimum amount of flexibility of the laminate. This "hot melt" technique improves the flexibility of the structure but is limited by the adhesion of the thermoplastic to the textile substrate. Moreover, the thermoplastic material does not surround the individual elements or fibers in the base textile substrate, since it does not penetrate into the yarn structures. U.S. Pat. No. 4,181,157 addressed the malleability/flexibility concern by cutting the woven glass fiber substrate into strips to increase the flexibility of the normally coiled sheet when installed on the line to permit the sleeve and protected line to assume curved configurations without buckling or separation of the sleeve. This technique creates a plurality of seams that create multiple points for potential leakage.

Still other techniques rely on pressuring a thermoplastic material into a base substrate or wrapping all the substrate and polymer layers into a predetermined shape and curing. These techniques rely on standard coating or pressuring techniques to create adhesion between layers of polymer and substrates. Such techniques are further described in U.S. Pat. Nos. 3,969,177; 3,972,757; 4,511,615; 5,398,729; and 5,677,046. These techniques contain some of the same limitations discussed in the above categories.

FIGS. 1a, 1b and 1c illustrate three types of prior art treatments discussed above. FIG. 1a illustrates a cross section of an immersion treatment of a fibrous textile substrate. The particulate spots on the surface of the fibers represent polymer residuals. FIG. 1b illustrates a cross section of a coating treatment of a fibrous textile substrate. The coating interacts with the fibers along one surface, creating a coating/fiber interface. FIG. 1c illustrates a cross section of a lamination treatment of a fibrous textile substrate. The laminate is adhered to one surface with an adhering agent, creating a laminate/fiber interface.

What is needed in the art is a single method for improving both adhesion between multiple layers and durability of such a composite article, while maintaining the malleability and characteristics of the base substrate.

SUMMARY OF THE INVENTION

The present invention relates to a method for improving both adhesion between substrate and polymer layers and the durability of such composite structures; while maintaining the malleability and preferred characteristics of the original substrate. The method comprises placing an uncured, substantially solvent free, polymer composition exhibiting thixotropic or pseudoplastic characteristics, onto a base substrate having structural elements and interstices therebetween; shear thinning the polymer composition to place it into the substrate, thereby encapsulating most of the structural elements while leaving a plurality of interstitial spaces open; applying a layer or film of polymer or thermoplastic material to at least one surface of the uncured encapsulated base substrate; pressuring the layer into the interstices of the uncured encapsulated base substrate to form a chemical and mechanical interlocking bond; and curing the completed composites. Optionally, the multi-layer composite may be formed into a shape prior to curing. This method produces multi layer composite articles and medical garments exhibiting increased adhesion and durability with excellent malleability and flexibility over conventional methods, as described herein below.

The methods employed for shear thinning one hundred percent (100%) solid polymers or substantially solvent free polymer compositions are described in the following patents and patent applications, all of which are incorporated herein by reference in their entirety, including any drawings: pending U.S. patent application Ser. No. 09/014,316 filed on Jan. 27, 1998; pending U.S. patent application Ser. Nos. 08/962,700, 08/963,636, 08/962,698 and 08/963,663, all filed Nov. 3, 1997; pending U.S. patent application Ser. No. 08/472,568 filed on Jun. 7, 1995; allowed U.S. patent application Ser. No. 08/442,983 filed on May 17, 1995, allowed Feb. 18, 1998; allowed U.S. patent application Ser. No. 08/407,191 filed on Mar. 17, 1995, allowed Oct. 21, 1997; U.S. Pat. No. 5,698,303, issued Dec. 16, 1997; U.S. Pat. No. 5,418,051 issued May 23, 1995; U.S. Pat. No. 5,209,965 issued May 11, 1993; U.S. Pat. No. 5,004,643, issued Apr. 2, 1991; and U.S. patent application Ser. Nos. 167,630, 167,643, 167,797 and 167,869 all filed on Mar. 14, 1988, now abandoned. Manipulation and alteration of the polymer composition and the web according to the methods of the above incorporated patents and patent applications, produces a web that either: (1) has a plurality of its structural elements encapsulated by the polymer composition while at least some of the interstitial spaces of the web are open; or (2) has an internal layer extending through the web; or (3) has both encapsulated structural elements and an internal layer of polymer composition.

The method employed for precision placement of thin polymeric films within substrates to achieve improved substrate performance is conducted substantially without the use of solvents. A polymeric composition is applied onto the surface of a web by a variety of means. After the polymer is applied to the surface of the web, the polymer composition is preferably immediately shear thinned to controllably and significantly reduce its viscosity and place it into selected places within the web. To aid in this process, the web is preferably distorted, typically by stretching at the location of the shear thinning. This distortion facilitates the entrance of the polymer composition into the web by creating a double or dual shear thinning. In the case of the web, this is produced by the combination of the edge condition of the blade, the engineered shear thinnable polymer, the speed of the web, and the subsequent repositioning of the fibers and filaments after their immediate passage under the edge of the blade.

Controlled placement of the polymer composition within a base web or substrate may be performed by a basic embodiment of a machine in accordance with U.S. patent application Ser. No. 08/407,191, filed on Mar. 17, 1995 and allowed on Oct. 21, 1997. The technique can be as simple as an applicator to apply viscous polymer to the surface of the web, a pair of facilities for applying tension to a section of the web and a blade forced against the web in the section under tension. The web is pulled under tension past the blade, or, alternatively, the blade is moved relative to the web, and the forces generated by the blade cause the polymer composition to flow into the three-dimensional matrix of the web, and controllably be extracted out of the web leaving a thin film of polymer encapsulating selected fibers, or an internal layer of polymer, or both. Tension on the web is preferably released thereafter, and for purposes of the present invention, the web is left uncured for the subsequent application of a layer or film, as described herein.

The ability to control the placement of polymers within a base substrate correlates directly to controlling the surface area within a given volume of the base substrate that is available for bonding to a subsequently applied layer or film. The result of this control translates into control over the degree of chemical and mechanical interlocking of the subsequently applied layer or film.

A layer or film of polymer or thermoplastic material is applied to at least one surface of the uncured, encapsulated base substrate via conventional coating and/or laminating techniques. Such techniques include, but are not limited to, knife-over-air, knife-over-roll, roll coating, reverse roll coating, gap coating, extrusion coating and other techniques of similar import. In one preferred embodiment of the present invention, the layer or film is applied using a knife-over-roll apparatus and method supplied by Mascoe Systems Corporation in Mauldin, S.C.

Alternative methods for layering encapsulated base substrates and subsequent polymer or thermoplastic materials may be employed, as described herein. One key aspect of all such methods is that the applied polymer or thermoplastic material(s) is pressured into the interstices of the encapsulated base substrate to form a chemical and mechanical interlocking bond. Some combinations of layering may include, but are not limited to, (1) a single encapsulated base substrate with one layer of polymer or thermoplastic material pressured together ("one ply"); (b) multiple "one ply" layers pressured together such that the encapsulated base substrate either remains exposed to air or is sandwiched between adjacent polymer or thermoplastic layers; and (c) a plurality of encapsulated base substrates alternatively stacked between a plurality of polymer or thermoplastic materials and then pressured together. It is to be understood that other such layering combinations may be resorted to for particular applications. The pressuring can occur at any stage of layering or alternatively, at different stages of the layering of encapsulated base substrates and subsequent polymer or thermoplastic materials. One key aspect for some applications is that during this preparation of multiple layers, the encapsulated base substrate is not cured, or at most, is only partially cured, maintaining its "tacky" characteristic. This allows the composite article to maintain its malleability in order to be shaped into a variety of articles such as ducts, hoses and seals. Once shaped, the multi layer composite articles may be cured. Moreover, results indicate that by leaving the base substrate uncured prior to the application of a layer or film, superior performance results are obtained.

Since the base textile substrate is uncured prior to the application of a layer or film, it is possible to utilize a two part polymer composition such as a two part, platinum cured, RTV silicone polymer supplied by Dow Corning, GE Silicones, Wacker-Chemie or any other commercial supplier; whereby one part is applied to the base textile substrate via the above identified shear thinning process and the second part is applied via the film layer processing step. Upon cure, the two parts cross-link into a homogeneous elastomeric silicone polymer. The chemical and mechanical interlocking bond formed between the substrate/polymer layers is such that only cohesive failure in the polymer can be detected upon peel tests. This means that the adhesive strength of the substrate/polymer layers is greater than the cohesive strength of the polymer being applied in the film layer processing step. This amazing result was unexpected and has occurred for a variety of polymer compositions.

Various other and further features, embodiments, and the like which are associated with the present invention will become apparent and better understood to those skilled in the art from the present description considered in conjunction with the accompanying drawings wherein presently preferred embodiments of the invention are illustrated by way of example. It is to be expressly understood, however, that the drawings and the associated accompanying portions of this specification are provided for purposes of illustration and description only, and are not intended as limitations on the invention.

BRIEF DESCRIPTION OF THE DRAWINGS

FIGS. 1a, 1b and 1c are illustrations depicting prior art treatments of fibrous substrates.

FIG. 4a is an illustration of a unit volume element of a solvent based polymer composition.

FIG. 4b is an illustration of a unit volume element of a one hundred percent (100%) solid polymer.

DESCRIPTION OF THE PREFERRED EMBODIMENTS

Figure 2:
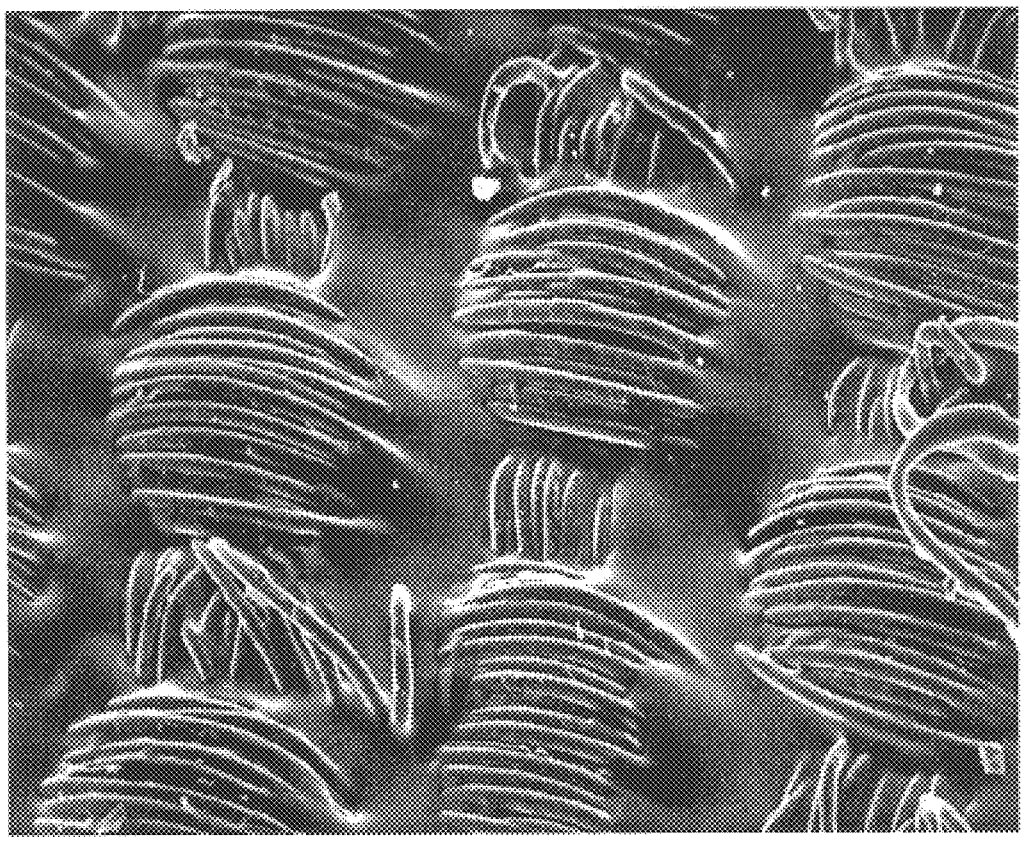
FIG. 2 is a Scanning Electron Microscopy (SEM) image of an encapsulated and internally coated base substrate treated in accordance with the present invention before application of a subsequent layer or film.

The following description includes the best presently contemplated mode of carrying out the invention. This description is made for the purpose of illustrating the general principles of the inventions and should not be taken in a limiting sense.

Quite unexpectedly, the application of a layer or film of polymer or thermoplastic material upon an uncured, encapsulated base substrate which has been encapsulated by the shear thinning methods described above, results in superior adhesion of multiple layers when compared to conventional layering, coating or composite manufacturing methods. Moreover, the uncured or at most, semi-cured, polymer composition applied to the base substrate ensures that the substrate maintains maximum flexibility for subsequent shaping into composite articles prior to curing. The methods described herein produce multiple layer composite articles that are lighter, stronger, more flexible and utilize less material than composite articles produced by conventional techniques.

DEFINITIONS

Encapsulation

The term "envelop" or "encapsulated" used interchangeably, refers to the partial or complete surrounding, encasement, or enclosing by a discrete layer, film, coating, or the like, of exposed surface portions of at least some individual fiber or lining of a cell or pore wall of a porous web. Such a layer can sometimes be contiguous or integral with other portions of the same enveloping material which becomes deposited on internal areas of a web which are adjacent to such enveloping layer, enveloped fiber, lined cell or pore wall, or the like. The thickness of the enveloping layer is generally in the range of 0.01 to 50 microns, and preferably in the range of about 0.05 to 25 microns, most preferably 0.1 to 10 microns. Measurements of the degree of envelopment, interstitial fillage, plugging, or the like in an internal coating are conveniently made by microscopy, or preferably by conventional scanning electron microscopy (SEM) techniques. Because of the nature of such measuring by SEM for purposes of the present invention, "a completely filled" interstitial space or open cell can be regarded as a "plugged" interstitial space or open cell.

Internal Layer

The term "internal coating or internal layer" as used herein, refers to a region generally spaced from the outer surfaces of the web which is substantially continuously filled by the combination of the polymer controllably placed therein and the fibers and filaments of the web in the specified region. Such coating or layer envelopes, and/or surrounds, and/or encapsulates individual fibers, or lines cell or pore walls of the porous web or substrate, in the specified region. The internal layer is not necessarily flat but may undulate or meander through the web, occasionally even touching one or both surfaces of the web. Generally, the internal layer is exposed on both sides of a web as part of the multi complex structure of a woven and non-woven web. The thickness of the internal layer is generally in the range of 0.01 to 50 microns, and preferably in the range of about 0.05 to 25 microns, most preferably 0.1 to 10 microns.

Web, Substrate or Base Substrate

The term "web," "substrate" or "base substrate" used interchangeably, is intended to include fabrics and refers to a sheet-like structure (woven or non-woven) comprised of fibers or structural elements. Included with the fibers can be non-fibrous elements, such as particulate fillers, binders, dyes, sizes and the like in amounts that do not substantially affect the porosity or flexibility of the web. While preferably, at least 50 weight percent of a web treated in accordance with the present invention is fibers, more preferred webs have at least about 85 weight percent of their structure as fiber. It is presently preferred that webs be untreated with any sizing agent, coating, or the like, except as taught herein. The web may comprise a laminated film or fabric and a woven or non-woven porous substrate. The web may also be a composite film or a film laminated to a porous substrate or a double layer. The web may optionally be pre-treated with a durable water repellent finish. Sample webs or fabrics that are beneficially treated, fiber enveloped and internally coated in accordance with the invention include nylon, cotton, rayon and acrylic fabrics, as well as fabrics that are blends of fiber types. Non-woven, monofilamentous, fabrics and the like are also employable.

The fibers utilized in a porous flexible web treated by the methods of the present invention can be of natural or synthetic origin or mixtures thereof. Examples include cotton, wool, silk, jute, linen, acetate, polyesters (including polyethyleneterephthalate), polyamides (including nylon), acrylics, olefins, aramids, azions, glasses, modacrylics, novoloids, nytrils, rayons, sarans, spandex, vinyl, vinyon, regenerated cellulose, cellulose acetates, and the like. Blends of natural and synthetic fibers can also be used.

The term "webs," "substrates" or "base substrates" includes flexible and non-flexible porous webs. Webs usable in the practice of this invention can be classified into two general types: (1) Fibrous structures; and (2) Structures having open cells or pores, such as foams.

Fibrous Structures

A porous, flexible fibrous web is comprised of a plurality of associated or inter-engaged fibers or structural elements having interstices or interstitial spaces defined therebetween. Preferred fibrous webs can include woven or non-woven fabrics. Other substrates include, but are not limited to, a matrix having open cells or pores therein such as foams or synthetic leathers. A flexible porous web used as a starting material in the present invention is generally and typically, essentially planar or flat and has generally opposed, parallel facing surfaces. Such a web is a three-dimensional structure comprised of a plurality of fibers with interstices therebetween or a matrix having open cells or pores therein. The matrix can be comprised of polymeric solids including fibrous and non-fibrous elements.

Open Cell Structures

Three principal classes of substrates having open pores or reticulated cells may be utilized in the present invention: leathers (including natural leathers, and man-made or synthetic leathers), foamed plastic sheets (or films) having open cells, and filtration membranes.

a. Foamed Plastic Sheets

Foamed plastic sheet or film substrates are produced either by compounding a foaming agent additive with resin or by injecting air or a volatile fluid into the still liquid polymer while it is being processed into a sheet or film. A foamed substrate has an internal structure characterized by a network of gas spaces, or cells, that make such foamed substrate less dense than the solid polymer. The foamed sheets or film substrates used as starting materials in the practice of this invention are flexible, open-celled structures.

b. Leathers

Natural leathers suitable for use in this invention are typically split hides. Synthetic leathers have wide variations in composition (or structure) and properties, but they look like leather in the goods in which they are used. For purposes of technological description, synthetic leathers can be divided into two general categories: coated fabrics and poromerics.

Synthetic leathers which are poromerics are manufactured so as to resemble leather closely in breathability and moisture vapor permeability, as well as in workability, machinability, and other properties. The barrier and permeability properties normally are obtained by manufacturing a controlled microporous (open celled) structure. Synthetic leathers are coated fabrics and the coating is usually either vinyl or urethane. Vinyl coatings can be either solid or expanded vinyl which has internal air bubbles which are usually a closed-cell type of foam. Because such structures usually have a non-porous exterior or front surface or face, such structures display poor breathability and moisture vapor transmission. However, since the interior or back surface or face is porous, such materials can be used in the practice of this invention by applying the curable, thixotropic material and one or more modifiers to the back face thereof.

c. Filtration Membranes

Filtration membranes contemplated for use in the practice of the present invention include microporous membranes, ultrafiltration membranes, asymmetric membranes, and the like. Suitable membrane materials include polysulfone, polyamide, polyimide, nitrocellulose, cellulose acetate, nylon and derivatives thereof. Other porous webs suitable for use in the practice of the present invention include fibers, woven and non-woven fabrics derived from natural or synthetic fibers, papers, and the like. Examples of papers are cellulose-based and glass fiber papers.

Encapsulated Base Substrate

The term "encapsulated base substrate" means a web, substrate or base substrate that has been treated in accordance with the shear thinning methods described herein. Such a structure comprises encapsulated structural elements and may, alternatively, include an internal layer.

Thixotropic or Pseudoplastic Materials

In general, any curable, thixotropic or pseudoplastic material may be used during the shear thinning encapsulation step of the present invention. Such materials are preferably one hundred percent (100%) solid polymers or polymer compositions substantially free of solvent, and more preferably silicone polymers. Notwithstanding the above, some solvent may be contained in the overall polymer composition, applied as a component of the overall composition, provided that such composition still retains its thixotropic or pseudoplastic characteristics for the purpose of shear thinning as described herein. A curable polymer composition utilized in the practice of this invention preferably has a starting viscosity that is greater than about 1000 centipoise and less than about 2,000,000 centipoise at a shear rate of 10 reciprocal seconds. It is presently most preferred that such composition have a starting viscosity in the range of about 5,000 to about 1,000,000 centipoise at 25° C. Such a composition is believed to contain less than about 1% by weight of volatile material.

The curable polymer composition is believed to be typically polymeric usually a mixture of co-curable polymers and oligomers), and to include a catalyst to promote the cure. The term "polymer", or "polymeric" as used herein, refers to mixtures of monomers and oligomers as well as polymers and polymeric compositions, to the extent that such compositions and mixtures are curable and shear thinnable. The polymers that can be used in the present invention may be completely polymerized polymers or may be mixtures of monomers or partially polymerized polymers commonly known as oligomers, or completely polymerized polymers. The polymer may be curable, partially curable or not curable depending upon the desired physical characteristics of the final product. The polymer composition can include additives. While silicone is a preferred composition, particularly two part, platinum cured, RTV polydimethylsiloxanes, other polymer compositions include polyurethanes, fluorosilicones, silicone-modified polyurethanes, acrylics, polytetrafluoroethylene-containing materials, neoprenes, high consistency rubbers (HCR), silicone polymers having other curing mechanisms such as peroxide cured silicone polymers, and the like, either alone or in combination with silicones.

Curing

A curable material is capable of undergoing a change in state, condition, and/or structure in a material, such as a curable polymer composition that is usually, but not necessarily, induced by at least one applied variable, such as time, temperature, radiation, presence and quantity in such material of a curing catalyst or curing accelerator, or the like. The term "curing" or "cured" covers partial as well as complete curing. In the occurrence of curing in any case, such as the curing of such a polymer composition that has been selectively placed into a porous flexible substrate or web, the components of such a composition may experience occurrence of one or more of complete or partial (a) polymerization, (b) cross-linking, or (c) other reaction, depending upon the nature of the composition being cured, application variables, and presumably other factors. It is to be understood that the present invention includes polymers that are not cured after application or are only partially cured after application. A polymer or polymer composition that is not cured may be referred to as being "uncured."

In bulk form, polymer cure profiles can be examined by rheometers, such as the Ares model rheometer made by Rheometric Scientific in Piscataway, N.J. Through analysis of cure profiles, one skilled in the art can determine a bulk polymer's starting condition and final curing condition. Anything between these two conditions is determined to be a "partial cure," without any reference to an exact degree of partial cure. Such a device as the Ares model rheometer, is readily used and understood by one skilled in the art. The term "partial cure" is readily understood to be any degree of curing short of complete curing.

Certain unexpected benefits of not curing or only partially curing the polymer composition after encapsulation of a base substrate have been identified. For example, conventional industrial composite applications, when applying a layer or film to conventional "primed" base substrates, require that the "primed" substrate be placed at certain angles relative to the applied layer or film or that they be cut into strips to increase the flexibility of such primed substrates. In contrast, encapsulated base substrates of the present invention are more flexible and malleable than conventional solvent applied substrates, resulting in a greater ability to shape complex industrial composite articles. For some applications, the ability to handle and subsequently process encapsulated base substrates without first curing the substrate is an integral aspect of the present invention and is due to the thixotropic or pseudoplastic characteristics of the polymer composition applied. The viscous nature of such polymer compositions allow them to resist the effect of gravity so that the initial placement into the substrate via shear thinning is maintained over prolonged periods of time, even in the absence of curing. Nevertheless, at times, it may be desired to at least partially cure the applied polymer composition, leaving the encapsulated substrate with a "tacky" feel or fully cure the polymer composition, if necessary for a particular application. Partial curing is a technique sometimes employed to shape the treated substrate for various containers or vessels prior to full curing. Moreover, results indicate that by leaving the base substrate uncured prior to the application of a layer or film, superior performance results are obtained. It is believed that this phenomenon is due in part to the loose structure of the uncured polymer within the base encapsulated substrate, which allows it to conform to the overlaid layer or film, thereby enhancing the chemical and mechanical interlocking.

Conventional curing conditions known in the prior art for curing polymer compositions are generally suitable for use in the practice of this invention. Thus, temperatures in the range of about 250° F. to about 350° F. are used and times in the range of about 30 seconds to about 1 minute can be used, although longer and shorter curing times and temperatures may be used, if desired, when thermal curing is practiced. Radiation curing, as with an electron beam or ultraviolet light, can also be used. However, using platinum catalysts to accelerate the cure while using lower temperatures and shorter cure times is preferable.

Curing temperatures from about 320° F. to about 500° F., applied for times of from about two minutes to about thirty seconds (depending on the temperature and the polymer composition) are desirable. If a curing accelerator is present in the polymer, curing temperatures can be dropped down to temperatures of about 265° F. or even lower (with times remaining in the range indicated). The cure temperature is controlled to achieve the desired cross linked state; either partial or full. The source and type of energy can also affect the placement of the polymer and additives. In place of an oven, or in combination with an oven, a source of radiation can be employed (electron beams, ultraviolet light, or the like) to accomplish curing, if desired.

Shear Thinning

For the purposes of the present invention, a thixotropic or pseudoplastic material has a liquid flow behavior in which the viscosity of a liquid is reduced by shear agitation or stirring so as to allow the placement of the liquid flow to form: (a) a thin film of a polymer composition encapsulating the structural elements (i.e. the fibers or filaments) making up the web leaving at least some of the interstitial spaces open; (b) an internal layer of a polymer composition; or (c) some combination of the foregoing. It is theorized to be caused by the breakdown of some loosely knit structure in the starting liquid that is built up during a period of rest (storage) and that is broken down during a period of suitable applied stress.

Energy sources contemplated for use in the practice of the present invention include subjecting the curable, thixotropic material to shearing conditions. The term "shear thinning," in its broadest sense, means the lowering of the viscosity of a material by the application of energy thereto.) For example, the shearing conditions may be provided by passing the treating material and web in contact with one or more blades at a fixed orientation with respect to the blades. The blades may be either rigid or flexible to accommodate a greater variety of web materials. For example, a more rigid blade may be used if the web is soft and flexible. Similarly, a flexible blade may be used if the web is hard and rigid.

Alternatively, the energy may be provided by passing the treating materials and web through rollers at a controllable pressure. Other sources of energy contemplated for use in the practice of the present invention include thermal energy, ultrasonic energy, electron beam, microwave, and electromagnetic radiation. The pressured application of the polymer is sensitive to the viscosity of the polymer composition. Temperature affects the polymer composition by reducing or altering its viscosity, although at above a certain temperature the polymer will begin to cure. Shear-induced temperature changes occurring during application or during subsequent shear processing of the polymer can affect viscosity. The chemical composition of the polymer also plays a role in the treating process and effects in the treatment of web structural elements (including fibers) and the regulation of the filling of interstices and open cell voids.

Multiple Layer Adhesion Methods

The method for improving both adhesion between substrate and polymer layers and the durability of such composite structures comprises placing an uncured, substantially solvent free, polymer composition exhibiting thixotropic or pseudoplastic characteristics, onto a base substrate having structural elements and interstices therebetween; shear thinning the polymer composition to place it into the substrate, thereby encapsulating most of the structural elements while leaving a plurality of interstitial spaces open; applying a layer or film of polymer or thermoplastic material to at least one surface of the uncured encapsulated base substrate; pressuring the layer into the interstices of the uncured encapsulated base substrate to form a chemical and mechanical interlocking bond; and curing the completed composite. Optionally, the multi-layer composite may be formed into a shape prior to curing. This method produces multi layer composite articles and medical garments exhibiting increased adhesion and durability with excellent malleability and flexibility over conventional methods, as described herein below.

The methods employed for shear thinning one hundred percent (100%) solid polymers or substantially solvent free polymer compositions are described in the patents and patent applications identified above, all of which are incorporated herein by reference in their entirety, including any drawings. Manipulation and alteration of the polymer composition and the web according to the methods of the above incorporated patents and patent applications, produces a web that either: (1) has a plurality of its structural elements encapsulated by the polymer composition while at least some of the interstitial spaces of the web are open; or (2) has an internal layer extending through the web; or (3) has both encapsulated structural elements and an internal layer of polymer composition.

The method employed for precision placement of thin polymeric films within substrates to achieve improved substrate performance is conducted substantially without the use of solvents. A polymeric composition is applied onto the surface of a web by a variety of means. Preferably, the web is pulled under tension past a blade, or, alternatively, the blade is moved relative to the web, and the forces generated by the blade cause the polymer composition to reduce in viscosity and flow into the three-dimensional matrix of the web leaving a thin film of polymer encapsulating selected fibers, or an internal layer of polymer, or both. To aid in this process, the web is preferably distorted, typically by stretching at the location of the shear thinning. This distortion facilitates the entrance of the polymer composition into the web by creating a double or dual shear thinning. In the case of the web, this is produced by the combination of the edge condition of the blade, the engineered shear thinnable polymer, the speed of the web, and the subsequent repositioning of the fibers and filaments after their immediate passage under the edge of the blade. Tension on the web is preferably released thereafter, and for purposes of the present invention, the web is left uncured for the subsequent application of a layer or film, as described herein. FIG. 2 is a Scanning Electron Micrograph (SEM) depicting the application surface of a fibrous web treated according to the shear thinning method described herein. The base substrate of FIG. 2 shows a preferred internal layer or barrier film placed in the interstitial spaces between fiber bundles and encapsulated fibers within the bundles whereby the interstitial spaces between fiber bundles remain open. This base encapsulated substrate maintains most of the topology, hand, drape and feel of the original, untreated fabric.

The ability to control the placement of polymers within a base substrate correlates directly to controlling the surface area within a given volume of the base substrate that is available for bonding to a subsequently applied layer or film. The result of this control translates into control over the degree of chemical and mechanical interlocking of the subsequently applied layer or film. For example, by creating a base substrate that is primarily encapsulated with polymer and has substantially all of its interstitial spaces open, most of the fiber surfaces within the base substrate will be available for bonding to a subsequently applied layer or film.

Typical industrial fabric articles are used in "sealed fabric" structures and are sometimes referred to as "mechanical rubber goods" or "composites." Examples of products in this area are hoses, belts, and ducts. Conventional treatments for the construct of hose products start with a base fabric such as fiberglass or Nomex that is then "primed" for adhesion promotion using standard solvent based immersion methods described above in the Background section. The "priming" step is often conducted with a 20 to 30% solids solution in toluene of a High Consistency Rubber (HCR). The primed substrate is then taken through a calender with an additional sheet or layer of an HCR to yield a material having a nominal HCR thickness of 10 mls (0.010 inches). The peel strength and sometimes the lap shear of this material is measured using tests described below. This "sealed fabric" is then cut into strips due to their lack of flexibility, and the strips are further processed into final parts. The further processing involves wrapping the strips of "sealed fabric" onto a mandrel or a mold, then placing the material (single or multi-layer) into an oven to cure the rubber. The final part is subject to some type of accelerated aging to failure test, often burst test as described below.

The mechanism for failure with such materials can be adhesive failure in the prime layer (i.e. delamination) or cohesive failure in the HCR layer. Cohesive failure is the best that can be achieved with a particular HCR. In conventional treatments as described above, a 10 mls (0.010 inch) thick HCR layer is often chosen to get the greatest peel strength, although thinner, stronger layers are desired. At this thickness, utilizing conventional treatments, the mechanism of failure is often cohesive, that is, the adhesion of the HCR to the "primed" substrate is greater than the cohesive strength of the molecules in the HCR material. Critical issues to one skilled in the art are adhesive strength, solvent usage, flexibility or malleability of the "sealed fabric" and the overall weight, strength and thickness of the final composite articles. Unexpectedly, it has been found that the use of the process described in the present invention yields materials addressing such critical issues.

The present invention replaces the "priming" step of conventional methods with the encapsulation method described above. In doing so, the use of harmful organic solvents is halted because the present invention utilizes one hundred percent (100%) solid polymers or polymer compositions substantially free of solvent on the base substrate.

A layer or film of polymer or thermoplastic material is applied to at least one surface of the uncured, encapsulated base substrate via conventional coating and/or laminating techniques. Such techniques include, but are not limited to, knife-over-air, knife-over-roll, roll coating, reverse roll coating, gap coating, extrusion coating and other techniques of similar import. In one preferred embodiment of the present invention, the layer or film is applied using a knife-over-roll apparatus and method supplied by Mascoe Systems Corporation in Mauldin, S.C.

Alternative methods for layering encapsulated base substrates and subsequent polymer or thermoplastic materials may be employed, as described herein. One key aspect of all such methods is that the applied polymer or thermoplastic material(s) is pressured into the interstices of the encapsulated base substrate to form a chemical and mechanical interlocking bond. Some combinations of layering may include, but are not limited to, (1) a single encapsulated base substrate with one layer of polymer or thermoplastic material pressured together ("one ply"); (b) multiple "one ply" layers pressured together such that the encapsulated base substrate either remains exposed to air or is sandwiched between adjacent polymer or thermoplastic layers; and (c) a plurality of encapsulated base substrates alternatively stacked between a plurality of polymer or thermoplastic materials and then pressured together. It is to be understood that other such layering combinations may be resorted to for particular applications. The pressuring can occur at any stage of layering or alternatively, at different stages of the layering of encapsulated base substrates and subsequent polymer or thermoplastic materials. One key aspect for some applications is that during this preparation of multiple layers, the encapsulated base substrate is not cured, or at most, is only partially cured, maintaining its "tacky" characteristic. This allows the composite article to achieve its maximum adhesive strength and maintain its malleability in order to be shaped into a variety of articles such as ducts, hoses and seals. Once shaped, the multi layer composite articles may be cured. However, it is to be understood that curing may occur at any stage of layering, before or after shaping into composite articles. "One ply" composites of the present invention exhibit more flexibility than "one ply" composites made by conventional solvent applied priming methods, even when cured before shaping. This flexibility is believed to be due in part to the placement of polymer into the base substrate as opposed to onto the base substrate.

It is possible to apply one polymer to the base substrate via the encapsulation technique of the present invention and a different polymer or thermoplastic material as the layer or film. Alternatively, a two part polymer composition such as a two part, platinum cured, RTV silicone polymer supplied by Dow Corning, GE Silicones, Wacker-Chemie or any other commercial supplier may be utilized in the present invention. Such a composition may be utilized whereby one part is applied to the base textile substrate via the above identified shear thinning encapsulation process and the second part is applied via the film layer processing step. Upon cure, the two parts cross-link into a homogeneous elastomeric silicone polymer. The chemical and mechanical interlocking bond formed between the substrate/polymer layers is such that only cohesive failure in the polymer can be detected upon peel tests. This means that the adhesive strength of the substrate/polymer layers is greater than the cohesive strength of the polymer being applied in the film layer processing step. This amazing result was unexpected and has occurred for a variety of polymer compositions.

Figure 3:
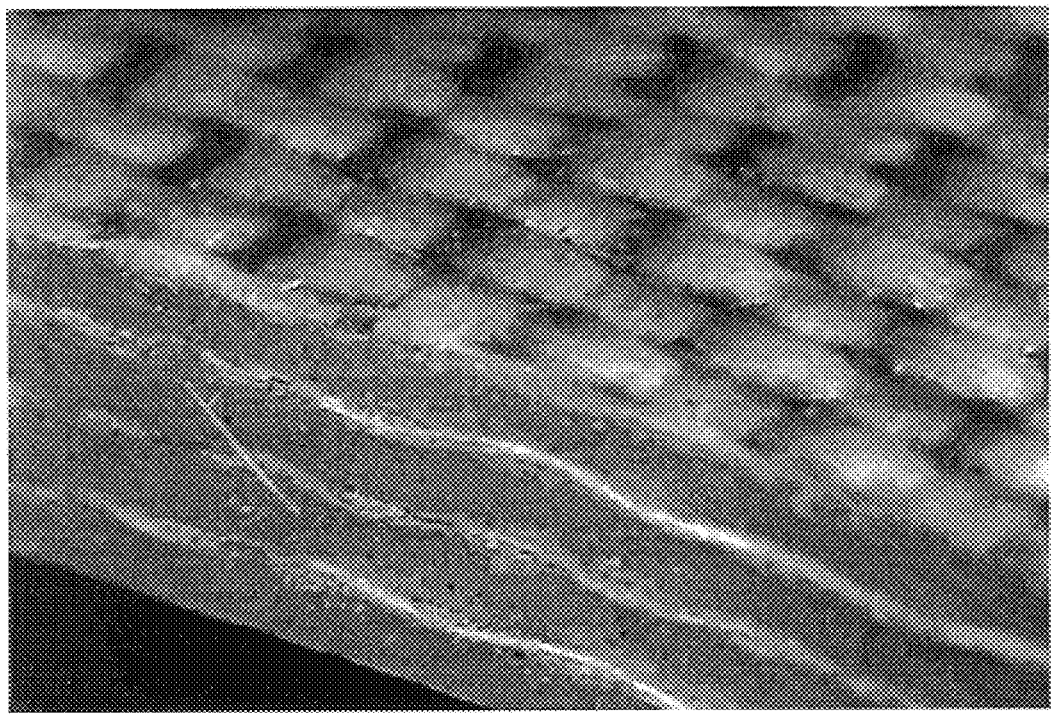
FIG. 3 is a cross sectional view of a multi-layer substrate prepared in accordance with the present invention.

FIG. 3 is an optical view of the cross section of a multiple layer composite made by the method of the present invention. The optical microscope used was the Hi-Scope MX-5030Z model made by HiRox Co., Ltd., a company located in Tokyo, Japan. The lighter color bundles are the fiberglass bundles of the encapsulated base substrate. The darker color layers are the HCR layers calendared onto and into the encapsulated base fiberglass substrate.

Theory of Invention

The following text concerns the theory of the invention as it is now understood; however, there is no intent herein to be bound by such theory. Any perceived inability to accurately describe the theory of the invention in no way detracts from the unique and unexpected results obtained and should not be considered as limiting the scope of the present invention.

The differences in performance, as shown in the examples below, between the products produced by the methods of the present invention versus conventional solvent applied priming and coating methods can be conceptually explained as described herein. Adhesion is the sum of surface interactions, mechanical interlocking, and molecular diffusion. "Surface interactions" refer to the attractions coming from Van der Waals forces, dipole/dipole interactions, Hydrogen bonding, and other interactions of similar type. Mechanical interlocking arises when the applied polymer or modifying material wraps around "nooks and crannies" or strikes through holes in the substrate. The applied polymer or modifying material has adhesive and cohesive components. The adhesive component describes how well the polymer or modifying material adheres to the substrate it is applied to and the cohesive component describes how well the molecules of the applied polymer or modifying material are united throughout its mass. Once the applied polymer or modifying material has adhered to the substrate and mechanical interlocking has taken place, the cohesive strength of the polymer or modifying material is added to the strength of the overall composite, that is, one must rip apart the molecular structure of the polymer or modifier to remove it. The effects of molecular diffusion can be neglected by choosing a substrate that is relatively impervious to the penetration of the adhesive molecules and by performing the analysis at very short times after the adhesive is placed on the surface. In such a case, adhesion is then taken as the sum of surface interactions and mechanical interlocking and a comparison between the two techniques can be made.

Surface Interactions

Surface interactions are comprised of the following components: (a) strength per molecule; (b) molecules per area; and (c) total area. In examining surface interactions of the encapsulation method of the present invention versus conventional solvent applied priming for the treatment of a base fiberglass substrate, both systems utilize organopolysiloxane polymers. Therefore, the strength of the bond between a silicone molecule in an organopolysiloxane and a fiberglass molecule is probably the same in either system, eliminating the "strength per molecule" component from analysis of the two systems. However, the number of molecules per unit area and the total area of modified material is probably different, as described.

To illustrate the difference, it is useful to examine a typical unit volume element of a conventional solvent based method versus the one hundred percent (100%) solid based method of the present invention. FIGS. 4a and 4b illustrate a simplified drawing of two unit volume elements. FIG. 4a depicts a unit volume element of a conventional solvent system comprising thirty percent (30%) solids and seventy percent (70%) solvent solution. FIG. 4b depicts a unit volume element of the present invention comprising a one hundred percent (100%) solids polymer. The number of molecules in each case is taken to be the adhesive component of the mixture, theorizing that each silicone polymer molecule has some adhesive capability. In FIG. 4a, three (3) molecules of adhesive are present and in FIG. 4b, ten (10) molecules of adhesive are present, for a comparable unit volume element. Initially, when first applied to the base substrate, surface 100 of the material in FIG. 4a has three (3) adhesive molecules (seven solvent) as compared with ten (10) adhesive molecules on surface 200 in FIG. 4b. Some of the solvent molecules in FIG. 4a leave the surface, however, the complete removal of solvent from the surface and/or polymer network is not believed to be achieved (this is implied by the discoloration of the solvent applied polymer made in a sample of a material depicted in FIG. 4a, upon heating at 550° F.).

Accepting that there are more bonds per unit area in the application method of the present invention (i.e. 100% solids), the next component of the adhesive bonding is the total area available for bonding the composite layer which is later overlaid onto the "primed" base substrate in each of the composites. To illustrate the "area" component of adhesion, a comparison test was carried out on a base substrate of a 7628 style fiberglass. The base, untreated fabric starts at 6 mls (0.006 inch) thick. Using conventional solvent priming methods, a thirty percent (30%) solids solution of a High Consistency Rubber (HCR) in toluene was prepared, yielding a 10% weight add on and a thickness increase of 2 mls (to a total of 8 mls), while the one hundred percent (100%) solids application of the present invention yielded a 13% weight add on and only a 1 mil (to a total of 7 mls) thickness increase. This is indicative of the solvent application tending to be more on the surface of the composite and the method of the present invention tending to be inside the base substrate and around the individual fibers.

Figure 5:
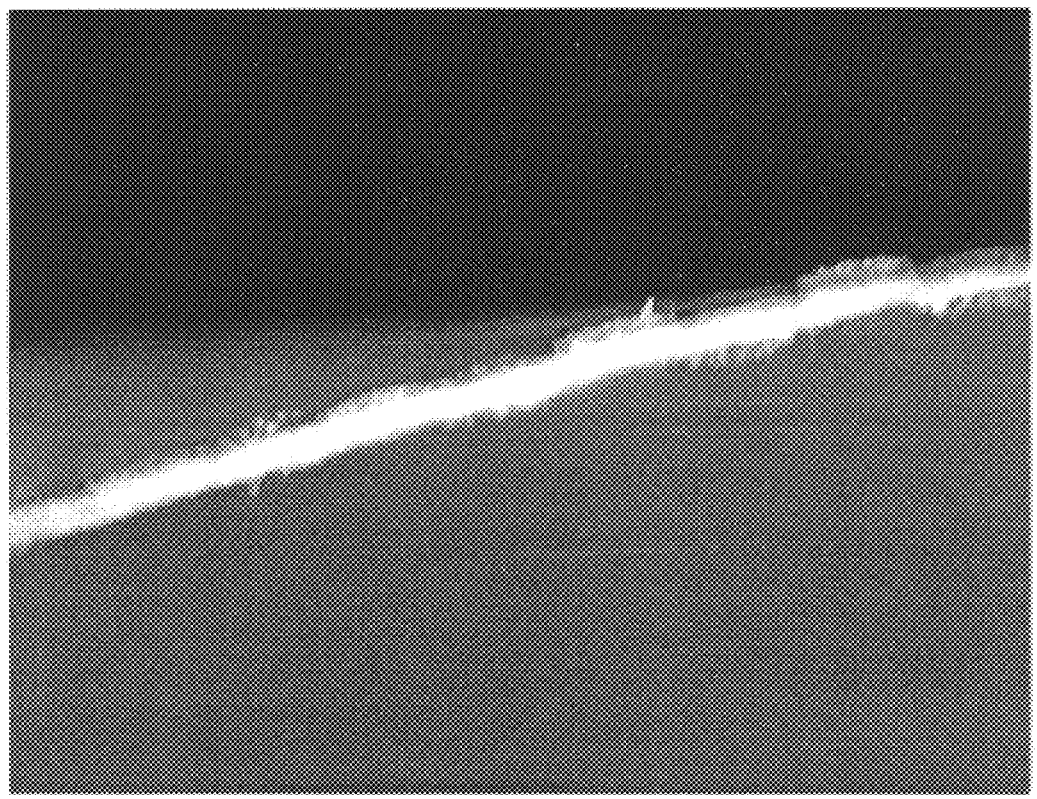
FIG. 5 is an optical microscopy image of a side view of a conventional solvent applied High Consistency Rubber (HCR) to a fiberglass substrate.

More evidence supporting the theory that the conventional solvent applied HCR material is primarily on the surface of the substrate is depicted in FIG. 5. FIG. 5 is an optical micrograph of a side view of the fabric made by solvent application of HCR. FIG. 5 was obtained using the Hi-Scope MX-5030Z model optical microscope made by HiRox Co., Ltd., a company located in Tokyo, Japan. In FIG. 5, the light color streak is the base fiberglass substrate, the "bumps" above and below are the fiber bundles of the base substrate and the darker grey color (as opposed to the black) represents the color of the HCR surfaces since the picture is a cross section view and the fabric sample bends back into the picture. The bright white base substrate shows no grey HCR discoloration, which indicates that the solvent applied HCR material does not penetrate into the bulk portion of the fiberglass and is present primarily at the surface of the fabric. In contrast, as depicted in FIG. 2, polymers penetrate into the bulk portion of the base fiberglass when applied via the shear thinning method of the present invention. Therefore, the conclusion is that there is a greater surface available for bonding to the layer or film from the one hundred percent (100%) solids application of the present invention as compared to the conventional solvent applied method, due to the greater surface area covered throughout the substrate. One skilled in the art recognizes that the actual optical image shows the HCR as a bright orange color.

Mechanical Interlocking

Figure 6A:
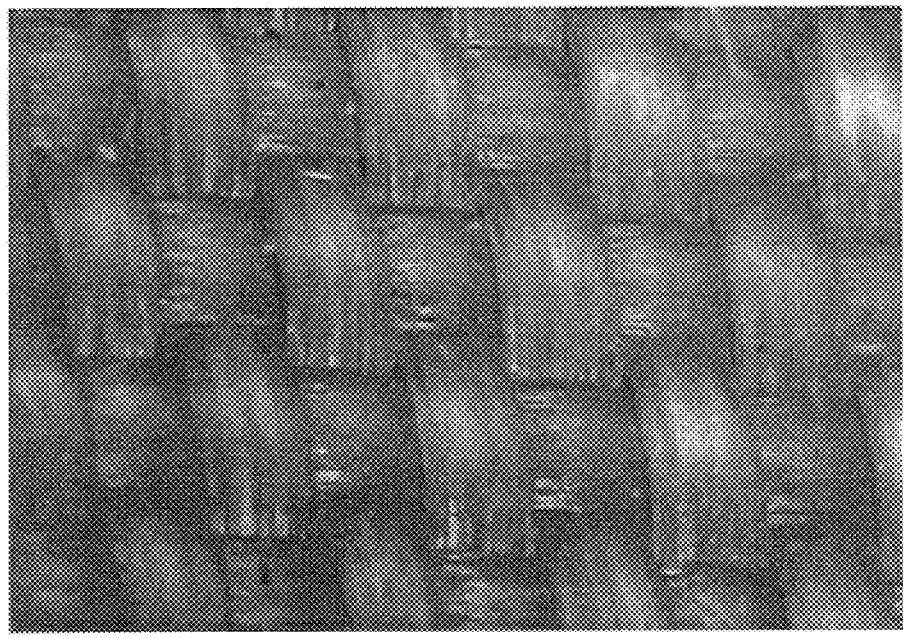
FIG. 6a is an optical microscopy image of the non-application side of a conventional solvent applied High Consistency Rubber (HCR) with a Neoprene rubber layer pressed into the opposite surface.
Figure 6B:
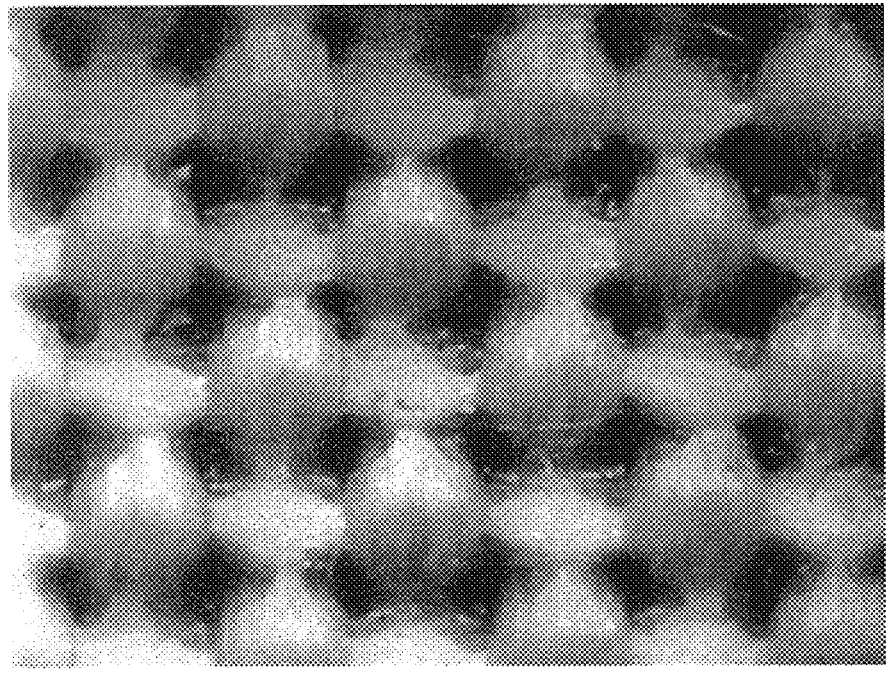
FIG. 6b is an optical microscopy image of the non-application side of an encapsulated substrate of the present invention with a Neoprene rubber layer pressed into the opposite surface.

Finally, the last adhesive component, mechanical interlocking, was examined by visualizing strike through of the layer or film in the two samples described above. This was done by placing a layer of black neoprene rubber onto one surface of each 7628 fiber glass base substrate described above, and pressing together the resultant materials in a Carver press. FIGS. 6a and 6b are optical micrographs of the surface of each base substrate that is opposite the black neoprene rubber layer, analyzed with the Hi-Scope MX-5030Z. FIG. 6a is the solvent applied HCR base substrate with the Neoprene rubber not penetrating through the fiberglass. FIG. 6b is the encapsulated one hundred percent (100%) solids material made by the methods of the present invention, with the black Neoprene rubber clearly penetrating through the individual fibers of the fiber bundles. Therefore, the conclusion is that there is a greater degree of mechanical interlocking involved in the one hundred percent (100%) solids application of the present invention as compared to the conventional solvent applied method.

Overall Adhesion

Figure 7A:
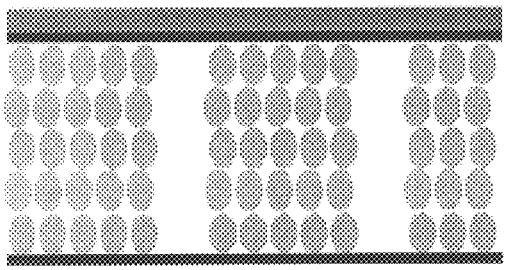
FIG. 7a is an illustration depicting the cross section of a conventional composite article.
Figure 7B:
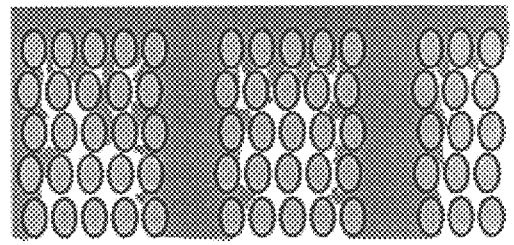
FIG. 7b is an illustration depicting the cross section of a composite article made by the method of the present invention.

The improved adhesion caused by improved surface interactions and mechanical interlocking can be conceptually viewed as in FIGS. 7a and 7b. FIGS. 7a and 7b are schematic drawings of cross section views for treated fibrous textile substrates as discussed in the above analysis. In each figure, the light grey round shapes represent fiber cross sections, the black lines represent the "priming" or "encapsulating" polymer and the dark grey represents the layer or film applied onto the base substrates. FIG. 7a depicts a typical base substrate prepared using the conventional solvent priming process and subsequent layering method. FIG. 7b depicts a base substrate prepared by the methods of the present invention, namely the encapsulation of a base substrate with a one hundred percent (100%) solid polymer and the subsequent layering method. FIGS. 7a and 7b are idealized to show the difference between a surface application of a solvent applied prime with a layer of an HCR rubber via conventional methods and an encapsulation of fibers through the fabric and penetration of an HCR layer into the fiber bundles via methods of the present invention.

Protective/Medical Garments

Commercial reusable medical garments are prepared much the same way as the composite articles described above with some differences. First, the base substrate is typically a polyester fabric. Second, the conventional solvent applied priming step is followed by a single coating or film laying step, without any other layers being sandwiched together. Reusable medical garments, such as surgical gowns, must meet high hydrostatic pressure requirements and should maintain a viral barrier, typically over many wash cycles. In order for such reusable garments to be cost effective, they must withstand a large number of industrial washes. Recognizing the similarity of process methods, the techniques developed for use in industrial composites were applied to polyester base substrates. The results once again exceeded expectations. The improved adhesive strength of the composite formed by the encapsulation of the base substrate followed by application of an occlusive layer or film compared to the composite with a conventional calendared emulsion applied prime and a coated layer, met or exceeded industry standards. The method of the present invention produces much lighter weight materials than compared to conventional methods, while meeting or exceeding industry requirements. Moreover, such lighter products have a better appearance than conventional fabrics.

Figure 8A:
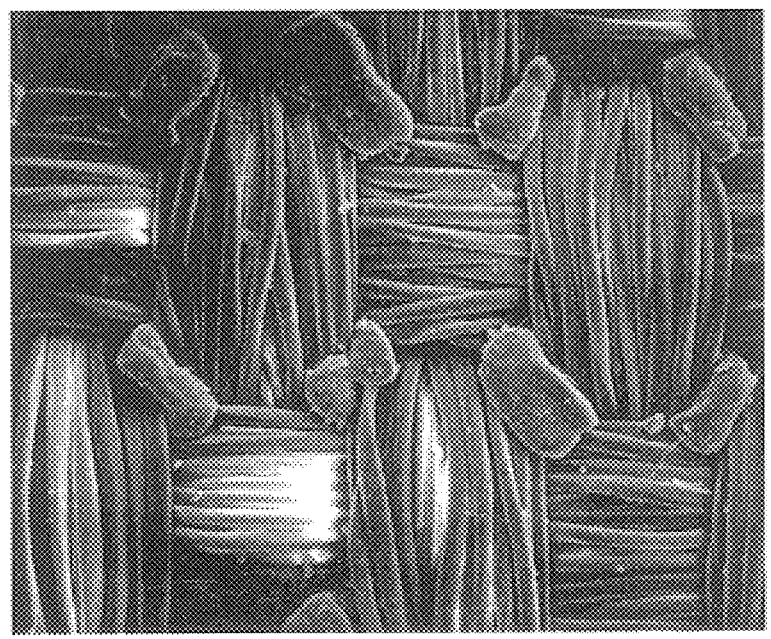
FIG. 8a is a Scanning Electron Microscopy (SEM) image of a medical garment fabric surface that has been calendared with a silicone emulsion.
Figure 8B:
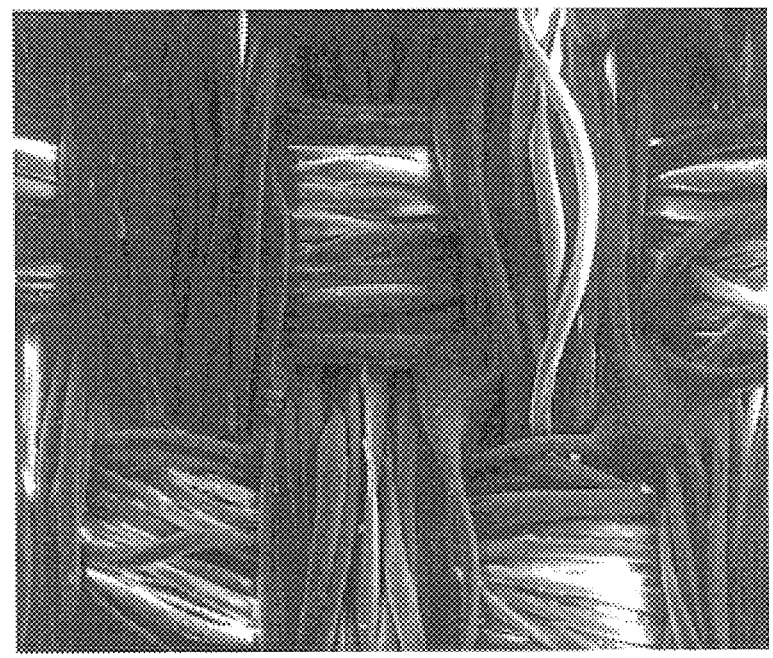
FIG. 8b is a Scanning Electron Microscopy (SEM) image of a medical garment fabric surface that has been treated in accordance with the method of the present invention.

For example, a problem that has long plagued the reusable medical garment industry has been the "flaking away" of polymer, typically silicone polymer, from the non-coated surface of conventional fabrics. Fabrics produced according to the method of the present invention do not exhibit these problems because the polymer is inside the base substrate, as opposed to on the surface. FIG. 8a shows a Scanning Electron Micrograph (SEM) of the non-coated surface for a conventional reusable medical garment fabric. The base substrate is a polyester fabric that has been calendared with a silicone polymer emulsion. The silicone polymer forms globules which are visible on the surface, similar to the illustration in FIG. 1a, described above. The silicone globules shown in FIG. 8a flake off of the fabric after continued use and washing. FIG. 8b, however, shows an SEM of the non-film layer surface for a fabric treated according to the method of the present invention. The base substrate is a polyester fabric that has been encapsulated through the shear thinning of a 100% solid organopolysiloxane polymer. No loose "globules" of silicone reside on the surface of the fabric. The only silicone polymer visible is through the warp/fill interstitial spaces, and not as globules on the surface, but as residual flow from the application surface (not shown).

EXAMPLES

This invention is further illustrated by the following examples, which are not to be construed in any way as imposing limitations upon the scope thereof. On the contrary, it is to be clearly understood that resort may be had to various other embodiments, modifications, and equivalents thereof, which, after reading the description herein, may suggest themselves to those skilled in the art without departing from the spirit of the present invention and/or the scope of the appended claims.

Examples of prior art composite hose manufacturing and testing methods are described in U.S. Pat. No. 4,181,157, issued Jan. 1, 1980, which is herein incorporated by reference in its entirety, including any drawings. All standard test methods, such as ASTM methods, referenced herein are incorporated by reference in their entirety.

Example 1

Preparation of Encapsulated Base Substrates

This example demonstrates the application of a silicone polymer to a fiberglass substrate resulting in an uniform uncured encapsulation of the fiberglass fibers. The selected base fabric was 7628 fiberglass supplied by Graphite Masters, Los Angeles, Calif., manufactured by Burlington Glass Fabrics (BGF). The fabric contained an amino-silane finish (643 finish) from the manufacturer. However, non-finished fiberglass fabrics may also be used. The fabric is tested for weight and air permeability and the air permeability is preferably between 40–80 cubic feet per minute as measured by the Gurley air permeometer, supplied by Gurley Precision Instruments, in Troy, N.Y., although other permeability techniques may be used.

The base fiberglass substrate is threaded through an application head which consists of a brake nip, a series of blades, idler rolls, and a pull nip. The tension zone is created by a differential ratio of nip speeds, the brake nip is run at 30 psi and the pull nip is run at 100 psi. Tensions are run at 240 lbs. The fiberglass substrate travels through a series of idler rolls and shearing blades. The shearing blades have sharp edges as a result of adjacent surfaces being polished to a Roughness Average (RA) of at least eight (8), which is sometimes referred to as RA 8 or RMS 8 under another roughness scale. A silicone polymer is applied directly in front of the first shearing blade. A second blade is used for further placement, as well as, the extraction of excess polymer from the base substrate which then passes through the pull nip. The angle of the substrate into a blade ("entry angle") and out from a blade ("exit angle") is measured from the substrate surface to the plane surface of the blade edge. The entry angle for blade one was approximately 27 degrees. The exit angle for blade one was approximately 20 degrees. The entry angle for blade two was approximately 16 degrees. The exit angle for blade two was approximately 12 degrees. The line was run at 10 yd/min. The resultant fabric had a thin film of silicone encapsulating polymer that was uncured and was able to be cured during subsequent processing.

The polymer applied was a one hundred percent (100%) solids two-part liquid silicone rubber by GE Silicones, with an experimental product number of 1277-01-029, Part B. This part B contains the typical components of an addition cure part B organopolysiloxane polymer in addition to an unknown proprietary adhesion promoter which allows the polymer to cure without the platinum catalyst that is typically contained in Part A of the two-part system. The 1277-01-029B is mixed with 0.75% by weight of a polymer supplied by Wacker Silicones Corp in Adrian, Mich. The polymer from Wacker is LR CM325, that is a pigment master batch which provides color as well as heat age stability.

Example 2

Preparation of Industrial Composite Hoses

This example demonstrates the method used to prepare industrial composite hoses in accordance with the present invention. This method describes the lay-up and cure procedure of fabricating a multiple ply encapsulated fiberglass material with High Consistency Rubber (HCR) sheets. The media used consisted of the following:

Lathe 4 inch diameter aluminum mandrel

Roll of 1.5 inch non-adhesive/adherent wrap or tape, approximately 30 feet long

Air circulating oven

Four pieces of encapsulated 7628 style fiberglass, as described in Example #1, approximately 4.5 inches by 6.5 inches, with the 6.5 inch length cut in the warp direction Four pieces of HCR sheets 0.020 inches thick, approximately 4.5 inches by 6.5 inches 1 piece of PTFE coated fiberglass, or equivalent, releasing film, approximately 1 inch by 4.5 inches 1 safety pin, or equivalent The four samples of encapsulated 7628 are marked on the silicone application side with a number (1,2,3,4) on the top left hand in the warp direction.

Lay-up of Specimens on Mandrel

This specimen preparation procedure is performed on the mandrel, with the motor off, so that the multi-layer specimen is wrapped around the mandrel. A piece of HCR is placed on a clean surface approximately 1 inch from the front end of the mandrel so that the 6.5 inch length is wrapped around the mandrel in the warp direction. The protective paper covering the HCR is slowly peeled off. The (#1) piece of encapsulated 7628 is placed, application side down, on top of the HCR (application side onto the HCR). Another piece of HCR is placed on top of the non-application side of the encapsulated 7628, creating a sandwich effect. The protective paper is slowly peeled off the HCR. The (#2) piece of encapsulated 7628 is placed, application side down, onto the top of the HCR. Another piece of HCR is placed on top of the non-application side of the treated 7628. The protective paper is slowly peeled off the HCR. A piece of 1 inch by 4.5 inch PTFE coated fiberglass releasing film, or equivalent, is placed on the layers so that approximately 0.90 inches is in contact with the encapsulated 7628 and approximately 0.10 inches is sticking out beyond the edge. The (#3) piece of encapsulated 7628 is placed, non-application side down, onto the top of the HCR. A piece of HCR is placed on top of the application face of the #3 piece of encapsulated 7628. The protective paper is slowly peeled off the HCR. The last piece (#4) of encapsulated 7628 is placed, non-application side down, onto the top of the HCR. Optionally, the same procedure above can be repeated, placing the second sample approximately 1 inch from the end of the mandrel, so that two specimens can be fabricated at the same time, as described below.

Pressure Wrap Procedure

The 1.5 inch nylon wrap or tape is threaded under the lathe and is wrapped around the mandrel at least two times so it is directly on top of itself, using a piece of HCR at the beginning of the nylon wrap so it does not slip while wrapping onto the mandrel. While holding the roll of tape firmly in your hand, the motor is started. The wrap pressure on the mandrel is maximized by slowly letting the lathe pull the nylon tape from your grip. The nylon tape is formed in a spiral pattern with approximately 0.5 inches overlap on each turn. The test specimen(s) are covered with the nylon fabric tape. The end of the nylon tape is pinned to the underneath layers, making sure not to pin the samples with the tape.

Cure Test Specimen

The mandrel is removed from the lathe. The entire assembly is placed in the preheated oven at 350° F. for 30 minutes. When the set time has elapsed, the mandrel assembly is removed from the oven and the pin is removed. Next, the nylon tape is unwrapped, causing it to "pop" because of cylinder expansion in heat when unwrapping, indicating a good initial wrapping. The nylon tape is saved for future use, up to 10 cycles of wrapping. Any more re-uses of the nylon wrap will cause it to constrict too much. The specimen is then pried from the mandrel using a wooden spatula or tongue depressor. The specimen is cooled by letting it set out at ambient temperature for at least 20 minutes. After 20 minutes remove the PTFE coated fiberglass releasing film, or equivalent. Thereafter, a section is tested as described below under Testing Procedure and the remaining sample is placed back into the oven at 450° F. for 4 hours and 550° F. for 15 minutes as described below under Testing Procedure.

Testing Procedure

Three 1 inch samples are cut from the 350° F., 30 minutes cure in the warp direction, and are marked with 1, 2, 3. Using the Peel Test Procedure for Fiberglass described in Example #4, each sample is peeled a maximum of 2 inches. The maximum peak load and average load are recorded. Any adhesive or cohesive failure is documented.

After the peel test, all three samples are placed back into the oven at 450° F. for 4 hours. Thereafter, the samples are removed and left to cool down for a minimum of 20 minutes before testing. Using the same Peel Test Procedure for Fiberglass, each sample is peeled a maximum of 2 inches. The maximum peak load and average load are recorded. Any adhesive or cohesive failure is documented.

After the peel test, place all three samples back into the oven at 550° F. for 15 minutes. Thereafter, the samples are removed and left to cool down for a minimum of 20 minutes before testing.

Using the Peel Test Procedure for Fiberglass again, each sample is peeled a maximum of 2 inches. The maximum peak load and average load are recorded. Any adhesive or cohesive failure is documented.

Example 3

Burst Strength Test (ASTM D 380-95)

This example demonstrates the methods used to test industrial composite hoses for burst strength. The methods employed are according to ASTM D 380-95. ASTM D 380-95 contains several tests related to industrial composite hoses. Section number 16 under this heading is used for burst strength analysis.

The test consists of pressurizing a section of hose with water and raising the pressure until failure occurs. All samples prepared were tested by Flexfab Horizons International, Inc. in Hastings, Mich. Sample hoses prepared by the methods of this invention, as described in Example 2, were tested and compared against samples utilizing conventional solvent applied priming methods. The results of the tests are shown in the table below.

TABLE 1

Burst Strength

| Sample | Cure | Test Applied | Burst Strength (psi) | Requirement (psi) |
|---|---|---|---|---|
| 7628 Fiberglass + solvent applied HCR + HCR layer | 30 min @ 350° F. | Original Burst | 100 | 15 |
| Example 2 sample | 30 min @ 350° F. | Original Burst | 130 | 15 |
| 7628 Fiberglass + solvent applied HCR + HCR layer | 30 min @ 350° F. & 4 hrs @ 350° F. | Original Burst | 180 | 135 |
| Example 2 sample | 30 min @ 350° F. & 4 hrs @ 350° F. | Original Burst | 200 | 135 |
| 7628 Fiberglass + solvent applied HCR + HCR layer | 30 min @ 350° F. | Heat Age Burst after 100 Hrs @ 450° F. | 70 | 15 |
| Example 2 sample | 30 min @ 350° F. | Heat Age Burst after 100 Hrs @ 450° F. | 120 | 15 |
| 7628 Fiberglass + solvent applied HCR + HCR layer | 30 min @ 350° F. & 4 hrs @ 350° F. | Heat Age Burst after 100 Hrs @ 450° F. | 150 | 135 |
| Example 2 sample | 30 min @ 350° F. & 4 hrs @ 350° F. | Heat Age Burst after 100 Hrs @ 450° F. | 200 | 135 |

HCR refers to a High Consistency Rubber, the components of which are available from Dow Corning Corporation, Midland, MI.

Example 4

Ply Adhesion and Peel Test

This example demonstrates the method to test the ply adhesion or peel strength of multiple layer composite articles such as fiberglass composites treated in accordance with the present invention. The ply. adhesion method covers the cut strip test procedure for determining the breaking force of composite materials and the peel test is described in ASTM D1876.

maximum values. The samples tested were prepared in accordance with Example 2 above. The following values in pounds per inch (ppi) for the breaking force of the test were obtained from the computer interface with the testing machine. These results indicate that composite layers made according to the present invention maintain most of their original ply adhesion strength throughout the propagation of the tear as opposed to composite layers made by conventional solvent applied techniques.

TABLE 2

Ply Adhesion Test

| SAMPLE | CURE | AVG. STRENGTH |
|---|---|---|
| Example 2 sample | 30 min @ 350° F., 4 hrs @ 450° F and 15 min @ 550° F. | 16.50 ppi |
| Solvent primed plus HCR layered composite | 30 min @ 350° F., 4 hrs @ 450° F and 15 min @ 550° F. | 5.69 ppi |

Ply Adhesion

The equipment used for testing is the MTS SINTECH 2/G Tall Tensile Testing Workstation Model #00.01405, with the accompanying Test Works Basic Package software, Model #00.01157 manufactured by MTS Systems Corporation, Eden Prairie, Minn.

Two or more layers of a multiple layer composite article are attached to the machine according to its operating procedures and the machine pulls the layers apart while measuring the amount of force necessary to pull the layers apart. The software measures the maximum load required to pull the layers apart and the average load required. Typical conventional composites have a maximum load during the initial tear and once the tear begins, the load may drop significantly during the propagation of the tear.

The unexpected results for fiberglass composite substrates prepared by the methods of the present invention show that the propagation peel strength is nearly as high as the initial maximum peel strength required. Composite fiberglass articles prepared by conventional solvent applied procedures show a significant drop in the peel strength after the initial A similar, but unrelated, type of peel test is used for determining the peel resistance of adhesives. This test is described in ASTM D1876 Standard Test Method for Peel Resistance of Adhesives (T-Peel test). The same apparatus used in ply adhesion is used to determine the peel strength. The adhesive resistance component of a thirty percent (30%) solids solvent based polymer and a one hundred (100%) solid polymer of the present invention were compared using this test method.

The 30% solids solution was prepared by placing small cut pieces of a High Consistency Rubber (HCR) in toluene to soak overnight. The soaking allowed the rubber to swell with the solvent, facilitating the mixing process. The solution was mixed for four (4) hours with a mechanical stirrer until the solution was consistent and there were no lumps remaining in the solvent. Strips of untreated fiberglass, style 7628, 1.5 inch by 12 inches, were cut and a 22 mil (0.022 inch) film was drawn down the fabric using a conventional doctor blade. A second piece of fiberglass was laid over top of the film and light pressure was applied to the fabric to ensure good contact. The samples were dried for twelve (12) hours and then cured in a forced air oven at 350° F. for thirty (30) minutes.

The 100% solids sample was prepared by applying a 100% solids RTV silicone polymer from GE Silicones to the same strips of fiberglass as described above. A 14 mil (0.014 inch) film was drawn down the fabric using a doctor blade. A second piece of untreated fiberglass was laid over top of the film and light pressure was applied to the fabric to ensure good contact. The samples were cured in a forced air oven at 350° F. for thirty (30) minutes.

Both samples were trimmed to a one (1) inch width and tested for their peel strength. The 30% solids solution polymer yielded an average peel strength of 0.5 pounds while the 100% solids polymer yielded an average peel strength of 5.3 pounds.

Example 5

Accelerated Failure Test

This example demonstrates the ability of composite structures produced by the methods of this invention to achieve a greater durability than composite structures produced by conventional solvent applied processes. The materials tested were industrial composite hoses made by the method of Example 2, above. The tests were performed by Burke Industries in Santa Fe Springs, Calif. The test consists of clamping the hose part in a fixture, subjecting it to an oscillating bend of ½ inch at 6 cycles/sec, and cyclic pressurizing/depressurizing from 0–45 psi 8 times per minute at 425° F. The number of hours before failure is detected (i.e. water leaks) is measured. Testing on conventional solvent treated composite straight hoses showed failure at between 13–40 hours. This failure was evidenced as a de-lamination at the seam. The present day requirement or specification for hose parts is 24 hours. Typically, failure is seen close to the 24 hour specification for conventional solvent treated hose parts. Testing of the hose part prepared by the methods of the present invention exhibited failure at 56 hours, and the mechanism of failure was catastrophic fabric failure, not failure at the seams. This means that the ultimate strength of the fabric had been achieved, which is the highest attainable value given a particular fabric and rubber composition.

Example 6

Weight Add-On and Thickness Determinations

This example demonstrates the methods used to determine weight add-on and thickness calculations of treated substrates, including multiple layer composite articles. The first method describes the procedure of testing polymer weight add-on for a treated substrate. The second method describes the procedure for testing the thickness of a treated substrate.

Weight Add-On

Weight measurements were made using the Model ER180A scale, manufactured by the A&D Co., Ltd. Of Tokyo, Japan. Three 12 inch by 12 inch samples of the untreated substrate are weighed and the average is taken to be the "untreated" weight. After the substrate is treated, three 12 inch by 12 inch samples of the treated substrate are weighed and the average is taken to be the "treated" weight. The weights are recorded and the area is used to calculate the lb/yd$^2$ weight. The difference in the weight of the treated substrate and the untreated substrate is the weight add-on.

Thickness Determinations

Thickness determinations are made using the Model #73-0668 Thickness Gauge, manufactured by Testing Machines, Inc., Islandia, N.Y. Three 8 inch by 12.5 inch samples of the material being examined are measured on the thickness gauge according to the manufacturer's procedure. No pressure is added to avoid squeezing the fabric. The machine can calculate values to within a one-hundredth thousand of an inch (0.00001 inch). All three values are recorded and the average is calculated. The average is used as the thickness.

Example 7

Preparation of Medical Garments

This example demonstrates the application of silicone polymer to a polyester substrate resulting in an uniform cured encapsulation of the polyester fibers and a barrier film layer thereupon. The selected base fabric was a 70 denier polyester manufactured and supplied by Precision Fabrics Group, Inc., Greensboro, N.C.

DWR Pre-treatment

The polyester fabric was dip treated with a specially developed durable water repellent ("DWR") finish prior to polymer application. The finish consists of 5% by weight Repearl F23, supplied by Mitsubishi International Co., New York, N.Y.; 0.5% by weight FreeRez MW, supplied by Stev-tex Inc., Santa Fe Springs, Calif.; and 0.2% by weight FreeCat UTX-2, supplied also by Stev-tex Inc., and 94.3% by weight water. This DWR formulation has proven to exhibit greater durability over wash than other formulations. It is believed that the polymer application step below lays down a thin enough layer so that the DWR molecules either expose out from the surface or migrate to the surface of the encapsulating film, thereby increasing hydrophobicity. The fabric was then tested for weight, air permeability, thickness and count. The total fabric weight after DWR treatment should be in the range of 2.6 to 3.0 ounces per square yard. The air permeability, as measured by the Gurley air permeometer, supplied by Gurley Precision Instruments, in Troy, N.Y. should be in the range of 14 to 20 cubic feet per minute. The fabric thickness after DWR treatment should be in the range of 0.22 to 0.26 millimeters. The count should be in the range of 144 by 100 to 150 by 97.

Polyester Encapsulation

The polyester fabric was threaded through an application head which consists of a brake nip, a series of blades, idler rolls, a pull nip and a tenter frame oven. The tension zone through the blade application was created by a differential ratio of nip speeds, the brake nip was run at 100 psi and the pull nip was run at 100 psi. Tensions are run at 440 lbs. The polyester web traveled through a series of idler rolls and shearing blades that are parallel to the floor. The shearing blades have sharp edges as a result of adjacent surfaces being polished to a Roughness Average (RA) of at least eight (8), which is sometimes referred to as RA 8 or RMS 8 under another roughness scale. Application of the polymer was directly in front of the first shearing blade. A second blade was used for further placement, as well as, the extraction of excess polymer and then the fabric was passed through the pull nip. The angle of the substrate into a blade ("entry angle") and out from a blade ("exit angle") is measured from the substrate surface to the plane surface of the blade edge. The entry angle for blade one was approximately 34 degrees. The exit angle for blade one was approximately 26 degrees. The entry angle for blade two was approximately 25 degrees. The exit angle for blade two was approximately 30 degrees. The line was run at 20 yd/min. The fabric was then fed trough a preheated tenter fiame oven supplied by Mascoe System Corporation, Mauldin, S.C., Model #886 at a speed of 20 yards per minute with the temperature in zone one of 350 ° F., in zone two of 350° F. and zone three as a cooling zone. The resultant fabric had a thin film of silicone polymer encapsulating fibers. Alternatively, the base polyester fabric can be left uncured until after the application of the barrier film layer as described below. It is believed that leaving the base substrate uncured before laying down the film layer results in better adhesion of the film.

The polymer applied was a one hundred percent (100%) solids two-part liquid silicone rubber by GE Silicones, with a product number of 6108, Part A and Part B in a 1:1 ratio plus additional platinum catalyst of 0.5% by weight of A and B. This silicone contained the typical components of an addition cure organopolysiloxane polymer in addition to an unknown proprietary adhesion promoter.

Film Application

The encapsulated polyester fabric was threaded with the encapsulated application side up through (a) an application head which consisted of a brake nip, pull nip and idler rolls, and (b) a secondary processing apparatus supplied by Mascoe System Corporation, Mauldin, S.C., which consisted of a blade, a back roll, a trough, and a tenter frame oven (Model #886). The;tension zone was created by a differential ratio of nip speed and tenter frame speed, where the brake nip was run at 20 psi, the pull nip was run at 50 psi and the tension between the break nip, pull nip and tenter frame were set to be at 100 pounds. The line speed was run at 5 yards/min. After the tension reached equilibrium, the pull nip was removed, thereby creating a tension zone between the brake nip and the tenter frame pins. The encapsulated polyester web traveled through a series of idler rolls and through a knife-over-roll processing zone created by a blade and a back roll. The blade had a rounded bullnose edge. The polymer was applied into the trough located in front of the blade. The trough gap to the blade was set to one (1) inch, the back roll speed was set to 8 yards per minute and the blade setting was set to a height that yielded a total treated weight of 6.0 to 6.5 ounce per square yard.

Example 8

Mullen Hydrostatic Resistance Test (ASTM D 751-95)

This example demonstrates the method used to determine the pressure resistance of a fabric treated according to Example 7, above. The test method is according to ASTM D 751-95. The machine used for this test is a Mullen, Model 6K778B, supplied by Mullen Testers in Chicopee, Mass. Some samples were washed many times before testing, per conventional laundering. A sample of the treated polyester fabric was clamped in with the silicone film side up on top of the platform. The Mullen was turned on and a cylinder pushed water against the non-film-layer side of the fabric. Pressure was increased until the fabric and/or silicone film layer bursts. The pressure was read at the highest reading and the results are contained in the table below. Moreover, even where test numbers appear to be similar, it is noted that the film layer for conventional solvent applied primed materials with a coating thereon tended to delaminate from the surface, resulting in a large silicone bubble.

The final encapsulated plus occlusive barrier layer treated material of the present invention was compared to the impermeable panel of a conventional commercial reusable medical garment. The results are shown in the tables below. All materials were subject to wash/dry cycles followed by hydrostatic testing via Mullen tester. The hydrostatic testing was done according to ASTM standard D 751-95. The commercial material is a 7.2 ounce material that under conditions of this test failed to hold 60 psi after 60 washes. The capsulated material with the occlusive barrier layer is a 6.0 ounce material that passed 60 psi after 60 washes and only failed to pass 60 psi after 70 washes. As a control, a standard coating film formed on an un-primed fabric without encapsulation failed at only 30 washes.

TABLE 3

ASTM D 751-95 Mullen Testing at 60 psi

|  | 30 Washes | 40 Washes | 50 Washes | 60 Washes | 70 Washes |
| --- | --- | --- | --- | --- | --- |
| 7.2 oz. Conventional | PASS | PASS | PASS | FAIL | FAIL |
| 6.0 oz. Encapsulated plus Occlusive Barrier Layer | PASS | PASS | PASS | PASS | PASS |
| Occlusive Barrier Layer Only | FAIL | | | | |

TABLE 4

Mullen Hydrostatic Resistance Test (ASTM D 751-95)

| Substrate | 0 wash | 75 wash |
| --- | --- | --- |
| 6.0 oz polyester (encapsulated plus occlusive barrier layer) | 150 psi | 90 psi |
| 7.2 oz conventional solvent applied prime plus coating layer | 85 psi | 50 psi |

Example 9

Mullen Burst Test (Modified ASTM Method)

This test is similar to Example 8, but with the addition of a panel fabric on top of the silicone film layer before testing. The panel fabric consists of a 100%, 70 denier polyester, 2.0 oz/sq. yd. carbon fiber.

TABLE 5

Mullen Burst Test (Modified ASTM D 751-95)

| Substrate | 0 wash | 75 wash |
| --- | --- | --- |
| 6.0 oz polyester (encapsulated plus occlusive barrier layer) | 290 psi | 250 psi |
| 7.2 oz conventional solvent applied prime plus coating layer | 260 psi | Up to 200 psi |

Example 10

Uncured vs. Cured Encapsulated Base Substrates

This example demonstrates the ability to improve performance of multiple layer composite articles by leaving the base encapsulated substrate uncured before applying a subsequent layer or film. The polyester samples tested were prepared using a simplified "hand pull" process wherein fabric is tensioned, polymer composition is applied to the tensioned fabric, and a knife is pulled across the fabric to shear thin the polymer composition, place it into the fabric, and pull the excess composition out of the fabric. Hand pulls do not always create an evenly encapsulated fabric due to human fluctuations in applying shear forces to the polymer composition. Webs treated with a more complicated machinery that is better capable of uniformly controlling operating conditions are believed to have similar or improved properties compared to such samples.

All of the polyester samples prepared utilized a polyester base substrate and a two-part RTV silicone polymer, GE 6108, supplied by GE Silicones. The samples were tensioned to 15 Newtons and a shearing knife was utilized to apply shear thinning forces to place the polymer into the base substrate and encapsulate the fibers. Half of the samples were cured at 350° F. for 24 seconds and half of the samples remained uncured. Thereafter, a film of additional GE 6108 silicone polymer was drawn onto each of the samples utilizing shims to ensure uniform thickness from sample to sample. All samples were then cured at 350° F. for 2 minutes and 40 seconds. The samples were then washed repeatedly and tested periodically for hydrostatic resistance per the Mullen Test as described in Example #8. The results are shown in Table 6 below. The results indicate that by leaving the base substrate uncured prior to the application of a layer or film, superior results are obtained. It is believed that this phenomenon is due in part to the loose structure of the uncured polymer within the base encapsulated substrate, which allows it to conform to the overlaid layer or film, thereby enhancing the chemical and mechanical interlocking.

Example 11

Viral Penetration Test (ASTM F1671-95, Formerly ES 22-92)

This example demonstrates the ability of webs treated in accordance with this invention to prevent the penetration of bloodborne pathogens. The treated web samples are tested according to ASTM F1671-95 (formerly ES 22-92). The pathogens of concern are the hepatitus B virus (HBV), hepatitus C virus (HCV) and the human immunodeficiency virus (HIV). Due to the infectious nature of these viruses, the assay uses a surrogate virus in conjunction with the ASTM F903 Chemical Penetration Cell apparatus. The Surrogate virus is the $\phi$X174 Bacteriophage.

Sterile test samples are placed in the Penetration Cell apparatus and challenged with the $\phi$X174 under various pressures and observed for penetration. At the conclusion of the test, the observed side of the article is rinsed with a sterile medium and then tested for the presence of $\phi$X174.

HBV, HCV, and HIV range in size from 27 nm (nanometers) to 110 nm. HCV is the smallest at 27–30 nm, HBV is 42–47 nm, and HIV is 80–110 nm. All have a spherical or icosahedral structure. The $\phi$X174 is one of the smallest known viruses at 25–27 nm and is also icosahedral or nearly spherical. The $\phi$X174 also grows rapidly and can be cultivated to reach very high titers.

The surface tension of blood and body fluids is known to be about 42–60 dynes/cm. In order to provide for similar

TABLE 6

Mullen Burst Test (Modified ASTM D 751-95)
Cured v. Uncured Encapsulated Base Polyester Substrate

| Substrate | 10 wash | 20 wash | 30 wash | 40 wash |
|---|---|---|---|---|
| Uncured Base Encapsulated Polyester + Film layer | 90 psi | 80 psi | 80 psi | 80 psi |
| Cured Base Encapsulated Polyester + Film layer | 90 psi | 65 psi | 65 psi | 64 psi |

A similar experiment was conducted using fiberglass as the base substrate. The samples were prepared according to the procedure described in Example #2 above. However, half of the samples utilized an uncured encapsulated base fiberglass substrate and half of the sample utilized a cured encapsulated base fiberglass substrate prior to application of the HCR layer, 20 mil (0.020 inches) thick. The samples were tested for ply adhesion via the methods described in Example #4. Again, the results indicate that by leaving the base substrate uncured prior to the application of a layer or film, superior results are obtained. The results are shown in Table 7 below.

wetting characteristics the surface tension of the 4X174 suspension is adjusted to about 40–44 dynes/cm via the use of a surfactant such as Tweerf® 80.

The treated web samples were treated to minimize viral penetration. Thicker internal layers or encapsulating films result in better test results but lower breathability. The samples were washed seventy five (75) times and then tested for viral penetration. All samples tested were prepared in accordance with Example 7 above. All samples in the test had a challenge concentration of $2.2 \times 10^8$ plaque forming units per milliliter (PFU/ml).

TABLE 7

Ply Adhesion Test
Cured v. Uncured Encapsulated Base Fiberglass Substrate

| Substrate | 350° F. Avg. | 450° F. Avg. | 550° F Avg. |
|---|---|---|---|
| Uncured Base Encapsulated Fiberglass + HCR layer | 18 ppi | 16 ppi | 16 ppi |
| Cured Base Encapsulated Fiberglass + HCR layer | 17 ppi | 15.8 ppi | 6 ppi |

TABLE 8

Viral Penetration Test Results

| SAMPLE THICKNESS (mm) | CHALLENGE CONCENTRATION (plague forming units/ml) | ES22 RESULTS |
|---|---|---|
| 0.31 | $2.2 \times 10^8$ | Pass |
| 0.30 | $2.2 \times 10^8$ | Pass |
| 0.29 | $2.2 \times 10^8$ | Pass |
| 0.30 | $2.2 \times 10^8$ | Pass |
| 0.29 | $2.2 \times 10^8$ | Pass |
| 0.30 | $2.2 \times 10^8$ | Pass |

All tests in this example were sent out for testing by Standard Textile, Cincinnati, Ohio and were tested by Nelson Laboratories, Inc. in Salt Lake City, Utah.

That which is claimed is:

1. A method of preparing a composite comprising the steps of:
    applying an uncured, substantially solvent free, polymer composition exhibiting thixotropic or pseudoplastic characteristics, onto a base substrate wherein said base substrate comprises structural elements with interstices therebetween;
    shear thinning the polymer composition to place it into the base substrate and encapsulate most of the structural elements while leaving substantially all interstitial spaces open;
    overlaying a layer of polymer or thermoplastic material on at least one surface of the uncured, encapsulated base substrate; and
    pressuring the layer into the interstices of the uncured encapsulated base substrate to form chemical surface interactions and mechanical interlocking bonds between the polymer composition of the base substrate and the overlay material.

2. The method of claim 1 wherein the shear thinned polymer composition is selected from the group consisting of silicones, polyurethanes, fluorosilicones, silicone-modified polyurethanes, acrylics, polytetrafluoroethylene (PTFE), PTFE-containing materials, neoprenes, high consistency rubbers (HCR), and combinations thereof.

3. The method of claim 1 wherein the material of the base substrate is selected from the group consisting of cotton, wool, silk, jute, linen, rayon, acetate, polyesters, polyethyleneterephthalate, polyamides, nylon, acrylics, olefins, aramids, azlons, glasses, fiberglass, modacrylics, novoloids, nytrils, rayons, sarans, spandex, vinal, vinyon, foams, films, foamed sheets, natural leathers, split hydes, synthetic leathers, vinyl, urethane, filtration membranes, polysulfones, polyimides, nitrocellulose, cellulose acetate, cellulose, and regenerated cellulose, and combinations thereof.

4. The method of claim 1 wherein the overlaying comprises coating the encapsulated base substrate.

5. The method of claim 1 wherein the pressuring is provided by calendaring.

6. The method of claim 1 further comprising curing the composite.

7. The method of claim 6 wherein the curing is provided by an energy source selected from the group consisting of thermal energy, an electron beam, microwave energy, electromagnetic radiation and ultrasonic energy.

8. The method of claim 1 wherein said chemical surface interactions include Van der Waal forces, dipole/dipole interactions or Hydrogen bonding.

9. The method of claim 1 wherein said mechanical interlocking bonds arise when the applied polymer layer is pressed through the interstitial spaces left open after encapsulation.

10. The method of claim 1 wherein the base substrate is threaded through an application head comprising a brake nip, a series of shearing blades, idler rolls, and a pull nip.

11. The method of claim 10 wherein the base substrate is fiberglass and the applied polymer layer is silicone.

12. The method of claim 1 further comprising the step of creating a multiple ply composite layer by stacking one composite layer on top of another.

13. The method of claim 12 wherein the base substrate is fiberglass and the applied polymer layer is high consistency rubber.

14. The method of claim 13 wherein the multiple ply composite layer has a burst strength of at least 180 psi.

15. A method of preparing a composite structure article comprising the steps of:
    preparing a plurality of one-ply composite layers by:
        applying an uncured, substantially solvent free, polymer composition exhibiting thixotropic or pseudoplastic characteristics, onto a base substrate wherein said base substrate comprises structural elements with interstices therebetween;
        shear thinning the polymer composition to place it into the base substrate and encapsulate most of the structural elements while leaving substantially all interstitial spaces open;
        overlaying a layer of polymer or thermoplastic material on at least one surface of the uncured, encapsulated base substrate;
    forming a composite structure shape by wrapping said one-ply composite layers so that the one-ply composite layers overlap;
    pressuring the one-ply composite layers of said composite structure into the interstices of adjacent one-ply composite layers to form chemical surface interactions and mechanical interlocking bonds between the polymer composition of the base substrate and the overlay material in adjacent one-ply composite layers; and
    curing the composite structure.

16. The method of claim 15 wherein the pressuring step consists of tightly wrapping said composite layers with a non-adhesive.

17. The method of claim 15 wherein preparing the one-ply composite layers further comprises the additional step of pressuring the layer into the interstices of the uncured encapsulated base substrate to form a chemical and mechanical interlocking bond between the polymer composition of the base substrate and the overlay material.

18. The method of claim 17 wherein the pressuring of said one-ply composite layer is provided by calendaring.

19. The method of claim 15 wherein the shear thinned polymer composition is selected from the group consisting of silicones, polyurethanes, fluorosilicones, silicone-modified polyurethanes, acrylics, polytetrafluoroethylene (PTFE), PTFE-containing materials, neoprenes, high consistency rubbers (HCR), and combinations thereof.

20. The method of claim 15 wherein the material of the base substrate is selected from the group consisting of cotton, wool, silk, jute, linen, rayon, acetate, polyesters, polyethyleneterephthalate, polyamides, nylon, acrylics, olefins, aramids, azlons, glasses, fiberglass, modacrylics, novoloids, nytrils, rayons, sarans, spandex, vinal, vinyon, foams, films, foamed sheets, natural leathers, split hydes, synthetic leathers, vinyl, urethane, filtration membranes, polysulfones, polyimides, nitrocellulose, cellulose acetate, cellulose, and regenerated cellulose, and combinations thereof.

21. The method of claim 15 wherein the overlaying comprises coating the encapsulated base substrate.

22. The method of claim 15 wherein the curing is provided by an energy source selected from the group consisting of thermal energy, an electron beam, microwave energy, electromagnetic radiation and ultrasonic energy.

23. The method of claim 8 wherein said chemical surface interactions include Van der Waal forces, dipole/dipole interactions or Hydrogen bonding.

24. The method of claim 15 wherein said mechanical interlocking bonds arise when the applied polymer layer is pressed through the interstitial spaces left open after encapsulation.

25. The method of claim 8 wherein the base substrate is threaded through an application head comprising a brake nip, a series of shearing blades, idler rolls, and a pull nip.

26. The method of claim 25 wherein the base substrate is fiberglass and the applied polymer layer is silicone.

27. The method of claim 15 wherein the base substrate is fiberglass and the applied polymer layer is high consistency rubber.

28. The method of claim 27 wherein the composite structure has a burst strength of at least 180 psi.

29. A method of preparing a composite comprising the steps of:

applying an uncured polymer composition exhibiting thixotropic or pseudoplastic characteristics, onto a base substrate wherein said base substrate comprises structural elements with interstices therebetween, defining an untreated base substrate ratio of surface area to total volume;

shear thinning the polymer composition to controllably place it into the base substrate and encapsulate most of the structural elements while leaving substantially all interstitial spaces open, thereby controllably effecting a change in the surface area available for chemical surface interactions and mechanical interlocking bonds between the polymer composition of the base substrate and the overlay material;

overlaying a layer of polymer or thermoplastic material on at least one surface of the uncured, encapsulated base substrate; and pressuring the layer into the interstices of the uncured encapsulated base substrate to form chemical surface interactions and mechanical interlocking bonds between the polymer composition of the base substrate and the overlay material.

30. The method of claim 29 wherein the applied uncured polymer composition is substantially free of solvent.

31. The method of claim 29 further comprising curing the composite.

32. The method of claim 29 wherein said chemical surface interactions include Van der Waal forces, dipole/dipole interactions or Hydrogen bonding.

33. The method of claim 29 wherein said mechanical interlocking bonds arise when the applied polymer layer is pressed through the interstitial spaces left open after encapsulation.

34. The method of claim 29 wherein the base substrate is threaded through an application head comprising a brake nip, a series of shearing blades, idler rolls, and a pull nip.

35. The method of claim 34 wherein the base substrate is fiberglass and the applied polymer layer is silicone.

36. The method of claim 29 further comprising the step of creating a multiple ply composite layer by stacking one composite layer on top of another.

37. The method of claim 36 wherein the base substrate is fiberglass and the applied polymer layer is high consistency rubber.

38. The method of claim 37 wherein the multiple ply composite layer has a burst strength of at least 180 psi.

* * * * *